United States Patent
Phillips et al.

(10) Patent No.: US 9,467,387 B2
(45) Date of Patent: Oct. 11, 2016

(54) SYSTEM AND METHOD FOR MANAGING BANDWIDTH RESPONSIVE TO THE DUTY CYCLE OF AN ABR CLIENT

(71) Applicant: ERICSSON TELEVISION INC., Duluth, GA (US)

(72) Inventors: Chris Phillips, Hartwell, GA (US); Robert Forsman, Sugar Hill, GA (US); Jennifer Reynolds, Duluth, GA (US)

(73) Assignee: ERICSSON AB, Stockholm (SE)

( * ) Notice: Subject to any disclaimer, the term of this patent is extended or adjusted under 35 U.S.C. 154(b) by 60 days.

(21) Appl. No.: 14/618,295

(22) Filed: Feb. 10, 2015

(65) Prior Publication Data

US 2016/0234125 A1  Aug. 11, 2016

(51) Int. Cl.
*H04L 12/26* (2006.01)
*H04L 12/873* (2013.01)
*H04L 29/06* (2006.01)

(52) U.S. Cl.
CPC ............ *H04L 47/522* (2013.01); *H04L 65/60* (2013.01)

(58) Field of Classification Search
None
See application file for complete search history.

(56) References Cited

U.S. PATENT DOCUMENTS

| | | | | |
|---|---|---|---|---|
| 5,541,852 A | * | 7/1996 | Eyuboglu | H04N 21/236 370/395.61 |
| 5,949,789 A | * | 9/1999 | Davis | H04L 49/102 370/452 |
| 6,011,798 A | * | 1/2000 | McAlpine | H04L 12/5601 370/395.42 |
| 2003/0179774 A1 | * | 9/2003 | Saidi | H04L 12/5693 370/468 |
| 2003/0225890 A1 | * | 12/2003 | Dunstan | H04L 29/06 709/227 |
| 2012/0059951 A1 | * | 3/2012 | Gutarin | H04L 47/2416 709/233 |
| 2014/0269314 A1 | * | 9/2014 | Ozer | H04L 47/25 370/235 |
| 2014/0281000 A1 | | 9/2014 | Dattagupta et al. | |
| 2015/0200992 A1 | * | 7/2015 | Houdaille | H04L 65/80 709/219 |

* cited by examiner

*Primary Examiner* — Anh-Vu Ly

(57) ABSTRACT

A scheme for managing bandwidth in a multi-client environment including one or more ABR clients and, optionally, one or more non-ABR clients. When an ABR client enters a sleep phase of its duty cycle, phantom tokens may be issued to simulate full capacity of the network link, wherein phantom packets are used for ABR bandwidth calculation. Any extra bandwidth that would have been used by another ABR client to artificially inflate its video quality may be optionally allocated to a non-ABR client engaged in a progressive download session in the same bandwidth pipe.

19 Claims, 14 Drawing Sheets

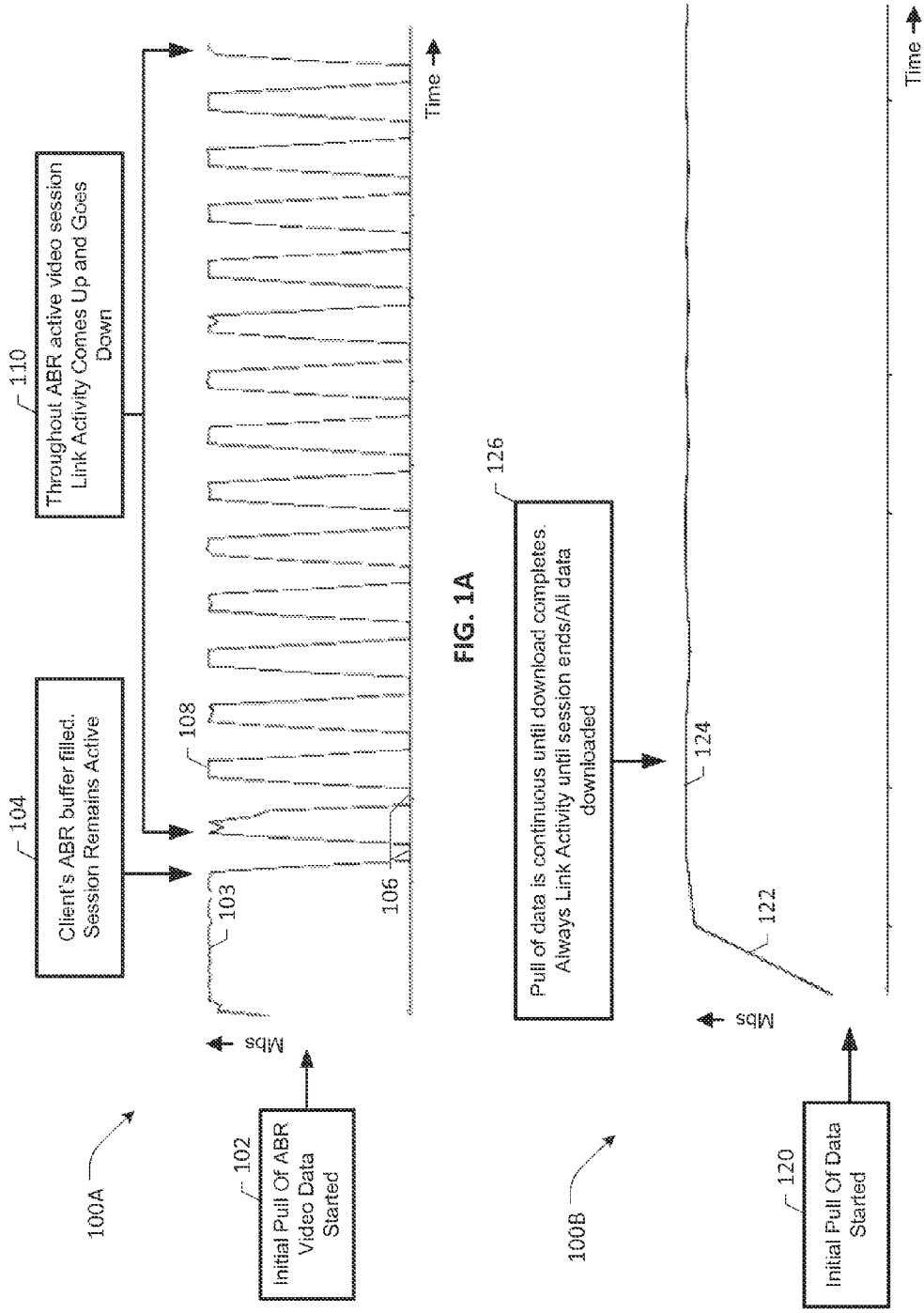

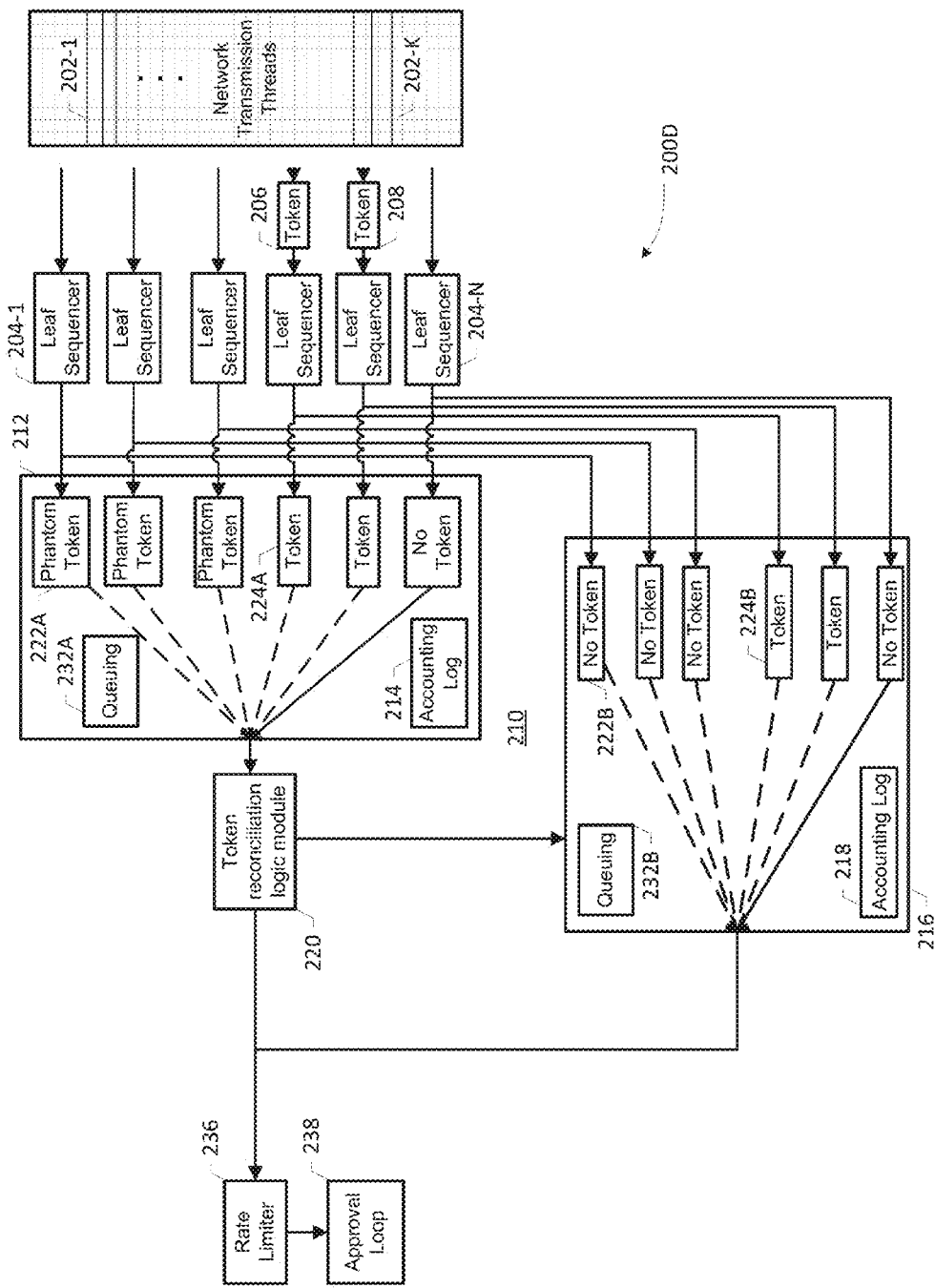

SYSTEM AND METHOD FOR MANAGING BANDWIDTH RESPONSIVE TO THE DUTY CYCLE OF AN ABR CLIENT

FIELD OF THE DISCLOSURE

The present disclosure generally relates to communication networks. More particularly, and not by way of any limitation, the present disclosure is directed to a system and method for managing the bandwidth of a communication link, e.g., a delivery pipe, responsive to the duty cycles of one or more adaptive bitrate (ABR) streaming clients of a network environment.

BACKGROUND

With the advent of new technology, e.g., home gateways with multiple tuners and Converged Cable Access Platforms (CCAPs), and the like, managed IP video services are now becoming feasible and cost-effective, in both wireline as well as wireless environments. Also, content delivery networks or CDNs are being developed to distribute various types of content via adaptive bitrate (ABR) streaming and non-ABR download sessions. It is known that ABR can result in unfair and sometimes incongruous apportionment of bandwidth on a network based upon the order multiple clients begin to use a network resource. Since the bandwidth usage is typically determined by a client requesting the content, and because the ABR clients can be opportunistic, they may become greedy. Traditional bandwidth management schemes are deficient in a multi-client environment, however, especially where the negative effects of a greedy client become more pronounced in the presence of a duty cycle of another ABR client.

SUMMARY

The present patent disclosure is broadly directed to a system, method, and associated non-transitory computer-readable media for facilitating a scheme for managing bandwidth in a multi-client environment including one or more ABR clients. Broadly, when an ABR client enters a sleep phase of its duty cycle, phantom tokens may be issued to simulate full capacity of the network link, wherein phantom packets are used for ABR bandwidth calculation. Any extra bandwidth that would have been used by another ABR client to artificially inflate its video quality may be allocated to another client, e.g., a non-ABR client engaged in a progressive download session in the same bandwidth pipe. Where there are no non-ABR clients, it should be appreciated that the greedy behavior of an ABR client is thwarted because of the conservative bandwidth estimation using phantom payload packets.

In one aspect, an embodiment of a bandwidth management method operative in a multi-client network including a plurality of adaptive bitrate (ABR) clients is disclosed. The claimed method comprises, inter alia, determining if an ABR client engaged in a streaming session is in a sleep phase of its duty cycle. If so, phantom payload packets may be provided on behalf of the ABR client in sleep phase to simulate network contention on a communication link shared by the ABR clients. Bandwidth allocation for remaining ABR clients that are in active phases of their respective duty cycles may be estimated by taking into the phantom payload packets.

In another aspect, an embodiment of a method for managing bandwidth of a delivery pipe serving a subscriber premises that includes at least one ABR client is disclosed. Optionally, one or more non-ABR clients may also be included in the subscriber premises, wherein the ABR and optional non-ABR clients may be engaged in respective communication sessions (e.g., a media streaming session by the ABR client and a progressive download session by the non-ABR client). The claimed embodiment involves, inter alia, when the at least one ABR client enters a sleep phase of a duty cycle associated with its ABR streaming session, receiving, at a first stage of a hierarchical token approval logic module (TALM), a phantom token from a leaf sequencer associated with a network transmission thread (NTT) corresponding to the at least one ABR client, wherein the phantom token is operative for providing a certain amount of phantom payload packets. If the first stage of the hierarchical TALM chooses the phantom token for approval, a second stage of the hierarchical TALM is operative to optionally replace the phantom token with a non-phantom token from a leaf sequencer associated with an NTT corresponding to a non-ABR client if included in the premises. The non-phantom token is processed pursuant to a weighted fair queuing module for obtaining permission to transmit a payload of the NTT corresponding to the optional non-ABR client. In an example implementation, the non-phantom token selected for replacement may depend on suitable bandwidth estimation for the delivery pipe.

In another aspect, an embodiment of an apparatus for managing bandwidth allocation of a delivery pipe serving a subscriber premises that includes at least one ABR client is disclosed. The claimed embodiment comprises, inter alia, a processor coupled to a hierarchical TALM component coupled to the processor. A persistent memory module coupled to the processor includes program instructions which, when executed by the processor, are configured to perform: when the at least one ABR client enters a sleep phase of a duty cycle associated with its ABR streaming session, receiving, at a first stage of the hierarchical TALM, a phantom token from a leaf sequencer associated with an NTT corresponding to the at least one ABR client, the phantom token for providing a certain amount of phantom payload data; if the first stage of the hierarchical TALM chooses the phantom token for approval, optionally replacing the phantom token, by a second stage of the hierarchical TALM, with a non-phantom token from a leaf sequencer associated with an NTT corresponding to a non-ABR client, if included in the subscriber premises; and processing the non-phantom token pursuant to a weighted fair queuing module for obtaining permission to transmit a payload of the NTT corresponding to the non-ABR client.

In another aspect, an embodiment of a bandwidth management system is disclosed. A plurality of NTTs corresponding to respective communication sessions of a plurality of client devices disposed in a subscriber premises served by a delivery pipe are provided, wherein the plurality of client devices includes one or more ABR clients and, optionally, one or more non-ABR clients. A plurality of leaf sequencers are configured to receive transmission request tokens from one or more NTTs, each leaf sequencer operating for a particular transmission class of communication flows or sessions. A two-stage token approval logic module that is selectively operable as a single stage module or a dual stage module is provided that includes a first stage component configured to receive: (i) phantom tokens from leaf sequencers servicing NTTs that correspond to one or more ABR clients in inactive phases of their respective traffic download duty cycles, (ii) regular tokens from leaf sequencers servicing NTTs that correspond to one or more ABR clients in active phases of their respective traffic download duty cycles, and (iii) regular tokens from leaf sequencers servicing NTTs that correspond to one or more optional non-ABR clients. In one embodiment, the first stage component may be configured to be selectively deactivateable responsive to a network operator's feature selection control signal. A second stage component of the token approval logic (operating in conjunction with the first stage component when it is activated) is configured to receive only regular tokens, e.g., tokens from leaf sequencers servicing NTTs that correspond to one or more ABR clients in active phases of their respective traffic download duty cycles, and/or tokens from leaf sequencers servicing NTTs that correspond to one or more optional non-ABR clients. A weighted fair queuing module is configured to operate respectively with the first and second stage components, for selecting regular tokens from either the first stage component or the second stage component for queuing payload data from the NTTs associated with the selected regular tokens for transmission via the delivery pipe. A token reconciliation logic module coupled to the first and second stage components is configured to perform: if the first stage component chooses a regular token, updating each accounting log of the first and second stage components in respective entries corresponding to the leaf sequencer from which the regular token is selected; otherwise, if the first stage component chooses a phantom token, updating the accounting log of the first stage component in an entry corresponding to the leaf sequencer from which the phantom token is selected; choosing a regular token by the second stage component to replace the phantom token with the regular token; updating the accounting log of the second stage component in an entry corresponding to the leaf sequencer from which the regular token is selected for replacement.

In a further aspect, an embodiment of a mobile edge node having phantom packet-based bandwidth transmission control is disclosed. The claimed embodiment comprises, inter alia, a processor coupled to a first interface operative to effectuate a communication link (e.g., a saturated backhaul link) to a base station having a coverage area for serving a plurality of mobile devices and to a second interface operative to effectuate an incoming broadband link for receiving ABR content from one or more content providers. The plurality of mobile devices may comprise one or more ABR clients that may be associated with one or more mobile subscribers. A bandwidth transmission controller is operative in association with the processor for managing bandwidth allocation of the communication link to the base station, wherein when an ABR client engaged in a media streaming session enters a sleep phase of its duty cycle, the bandwidth transmission controller is configured to simulate network contention on the communication link by accounting for phantom packets on behalf of the ABR client in the sleep phase and optionally allocate any excess bandwidth to a non-ABR client if served by the base station.

In a still further aspect, an embodiment of an edge delivery node disposed in a content delivery network (CDN) is disclosed wherein the functionality of phantom packet-based bandwidth transmission control may be advantageously provided. The claimed embodiment comprises, inter alia, a processor coupled to a first interface configured to effectuate a delivery pipe to a subscriber premises including one or more ABR clients and to a second interface configured to effectuate a regional distribution pipe with a regional distribution node of the CDN, wherein a central origin server coupled to the regional distribution node is operative to distribute ABR content and from one or more content providers. A bandwidth transmission controller is operative in association with the processor for managing bandwidth allocation of the delivery pipe to the subscriber premises, wherein when an ABR client engaged in a media streaming session enters a sleep phase of its duty cycle, the bandwidth transmission controller is configured to simulate network contention on the delivery pipe by accounting for phantom packets on behalf of the ABR client in the sleep phase and optionally allocate any excess bandwidth to a non-ABR client if included in the subscriber premises.

In yet another aspect, an embodiment of a bandwidth transmission control method is disclosed, wherein the claimed method comprises: estimating bandwidth in a communication link of a node operative to serve a plurality of client devices comprising one or more ABR clients by simulating network contention on the communication link using phantom packets on behalf of an ABR client that enters a sleep phase of its duty cycle; and selectively allocating any excess bandwidth to a non-ABR client sharing the communication with the ABR clients.

Another group of embodiments of the present patent disclosure relate to premises gateway implementations that involve phantom packet-based bandwidth delivery control similar to the embodiments set forth hereinabove. In still further aspects, one or more embodiments of a non-transitory computer-readable medium containing computer-executable program instructions or code portions stored thereon are disclosed for performing one or more embodiments of the methods set forth above when executed by a processor entity of a network node, gateway element, and the like. Further features of the various embodiments are as claimed in the dependent claims.

Advantages of the present invention include, but not limited to, the ability to provide a consistent quality of service to end users (e.g., no jarring effects due to rapid changes in video quality) in a multi-client environment comprising multiple ABR clients and/or one more non-ABR clients. Additionally, the present invention facilitates the network to allow non-ABR content to take up the bandwidth that would have otherwise been taken by conventional greedy ABR clients. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 1A depicts an embodiment of duty cycle behavior with respect to an example ABR client device;

FIG. 1B depicts an embodiment of typical download behavior with respect to an example non-ABR client device;

FIG. 2D depicts an embodiment incorporating hierarchical token approval logic based on suitable queuing for managing bandwidth allocation and QoS of video delivery according to an implementation of the system of FIG. 2A;

DETAILED DESCRIPTION OF THE DRAWINGS

Figure 2A:
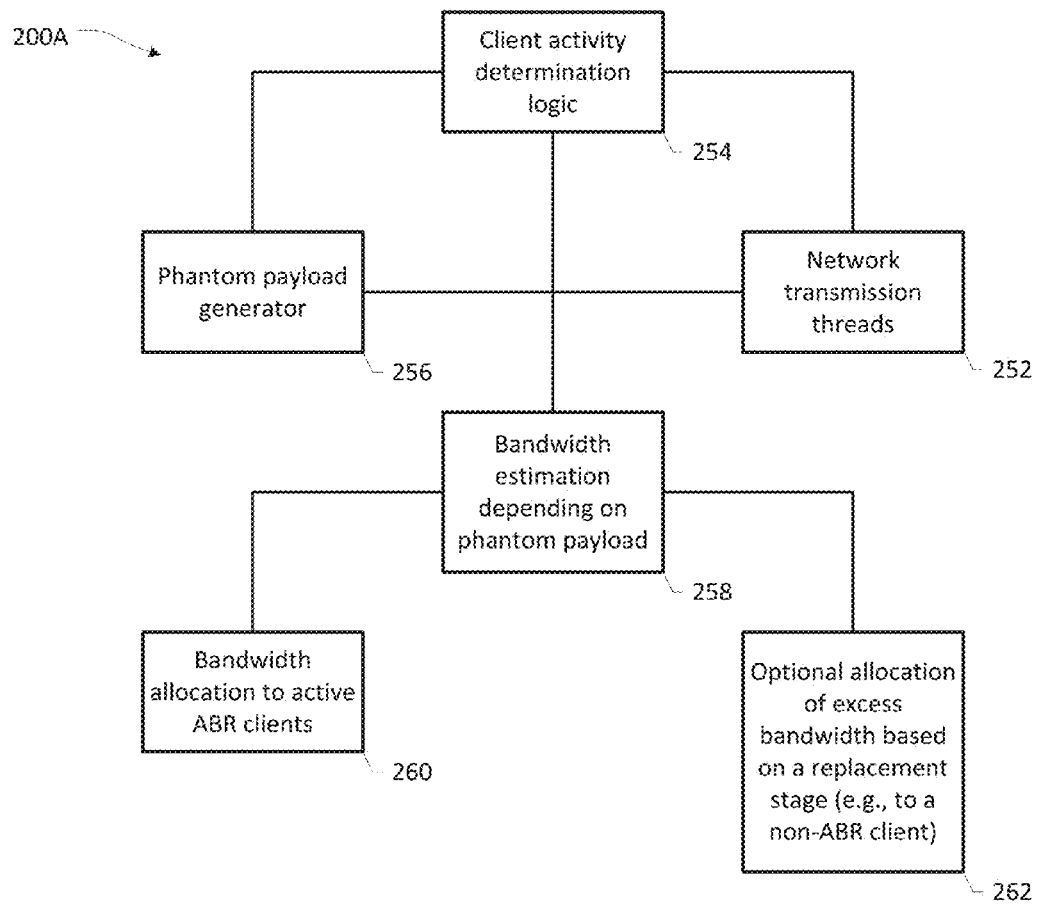
FIG. 2A depicts an embodiment of a bandwidth management and transmission control system involving phantom payloads for managing bandwidth allocation and QoS of video delivery according to an embodiment of the present patent application.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Further, suitable network elements including one or more embodiments set forth herein may involve terrestrial and/or satellite broadband delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. Accordingly, some network elements may comprise "multiple services network elements" that provide support for multiple network-based functions (e.g., A/V media delivery policy management, session control, QoS policy enforcement, bandwidth scheduling management based on weighted fair queuing (WFQ), subscriber/device policy and profile management, content provider priority policy management, streaming policy management, and the like), in addition to providing support for multiple application services (e.g., data and multimedia applications). Example subscriber end stations or client devices may comprise both ABR client devices and non-ABR client devices (progressive download client devices, for instance), which may be referred to simply as "clients" for short. Illustrative ABR client devices may include any device configured to execute, inter alia, a streaming client application for receiving and rendering content from one or more content providers, e.g., via a broadband access network, and compatible with, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. Such client devices may therefore include set-top boxes (STBs), TVs, personal/digital video recorders (PVR/DVRs), networked media projectors, portable laptops, netbooks, palm tops, tablets, smartphones, Voice Over Internet Protocol (VOIP) phones, mobile/wireless user equipment, portable media players, portable gaming systems or consoles (such as the Wii®, Play Station 3®, etc.) and the like that may access or consume content/services provided via a suitable high speed broadband connection for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

As pointed out above, ABR clients can be opportunistic and may become greedy, thereby affecting the overall quality of video delivery in a multi-client environment. In particular, traditional bandwidth management schemes may be "tricked" by duty cycles of ABR clients into overestimating available bandwidth, which may cause an opportunistic client to attempt to obtain higher bitrate content although the so-called additional bandwidth is seen only during the inactive phases (e.g., sleep phases) of the duty cycle. Typical ABR clients are configured to download ABR content in bursts, filling their buffer and then resting until more content is needed, which results in duty cycles that may vary from client to client. Further, the ABR clients may be configured to choose their own bitrate for downloading content based on network conditions. For purposes of one or more embodiments of the present disclosure, a duty cycle may be defined as a sequence of the intervals of an ABR client downloading until it fills its buffer, and then resting until the buffer is drained by a predetermined amount, e.g., due to completing the playout of a video segment. Referring to FIG. 1A, depicted therein is a screenshot embodiment 100A of an example ABR client's duty cycle behavior. In general, the ABR client begins to fill its buffer as hard as it can during initial startup phase 102 until it reaches a maximum capacity allowed under the network conditions (e.g., capped to a certain megabits/second of the managed delivery pipe such as 2 Mbs, 4 Mbs, 6 Mbs, etc.), as exemplified by trace portion 103. As the content segments are being downloaded into the client's buffer, their size and number may be monitored or otherwise tracked. The client may begin rendering/playout as soon as it can, and after a certain period of time, the ongoing action of downloading results in reaching a maximum buffer capacity. Accordingly, until the buffer is full, the session remains active (block 104), and the client's duty cycle may commence thereafter. While a segment is being played out of its buffer, the client may enter into a temporary inactive, or sleep, phase 106. When the playback of the segment is completed, the client (re)enters an active, or awake, phase 108, for pulling or downloading another block of content (e.g., the next segment) from the network so as to maintain the buffer capacity. This sequence or pattern of alternating active and sleep phases continues for the entire video session until a control action (e.g., pause, trick mode navigation, stop, etc.) takes place. It should be appreciated that throughout the ABR active video session, link activity (e.g., wired or wireless) comes up and goes down (i.e., oscillates) as set forth in block 110.

In contrast to the duty cycle-based behavior of ABR clients, a non-ABR client exhibits a constant activity behavior as illustrated in FIG. 1B wherein reference numeral 100B refers to a screenshot embodiment of a download process of the non-ABR client (e.g., a progressive download client running a web application). After starting the initial data pull 120, a ramping up phase 122 follows during initial stages, whereupon the client reaches a plateau 124 allowed under existing network conditions. The plateau phase 124 may be maintained relatively constantly (within certain ranges) for the duration of the session. During this phase, data pulling is performed continuously until the download is complete, with constant link activity for the entire session until the end or the data download is completed (block 126).

Based on the foregoing discussion, it can be appreciated that an ABR client that begins downloading a segment during a resting period for other ABR clients may discover that it has a lot of extra bandwidth available, even though on average the bandwidth pipe may be fully utilized. If that ABR client ramps up its bitrate to a higher quality and starts to download segments encoded at higher bitrate(s), it may soon encounter a situation where one or more of other ABR clients become active in accordance with their respective duty cycles and start downloading content. In such conditions, the first ABR client trying to maximize its video quality under the perceived increase in available bandwidth may in fact be forced to adapt to a lower bandwidth condition, thereby decreasing the video quality rapidly. Because multiple clients may be actively engaged in respective video sessions at any time, wherein each client may exhibit a duty cycle specific to its own performance characteristics, the duty cycles in a multi-client environment (e.g., a subscriber premises served by a broadband delivery pipe or a base station serving a plurality of mobile clients) may be asynchronous to one another, with highly unpredictable occurrences of peaks (active phases) and valleys (sleep phases) with respect to any particular ABR client. Accordingly, an ABR client that tries to preemptively/proactively increase its bandwidth consumption during the resting period(s) of the other clients may experience rapid variation in its video quality (high to low and low to high), potentially oscillating in a ping-pong fashion between extremes of quality (i.e., QoS "thrashing"), thereby resulting in unsatisfactory user experience. Furthermore, one skilled in the art should recognize that such quality concerns may become even more aggravated when multiple clients having different priorities, weights, and policies come on line at varying times in a serving network, thereby dynamically—and often quite unpredictably—changing the network conditions.

FIG. 2A depicts an embodiment of a bandwidth management and transmission control system 200A involving phantom payloads for managing bandwidth allocation and QoS of video delivery according to an embodiment of the present patent application. Broadly, system 200A may be configured in some implementations to operate as part of or otherwise be associated with a network node disposed in an edge distribution network associated with a DSL architecture, DOCSIS/CMTS architecture, or a CDN architecture, wherein a subscriber premises (e.g., home, office, building, campus, organization, etc.) having a plurality of client devices is served by an incoming broadband delivery pipe. In other implementations, system 200A may be configured to operate at a premises element, e.g., a DSL gateway or a cable modem, associated with the subscriber premises. In a further implementation, system 200A may be provided in association with a radio network controller (RNC) operative to effectuate a broadband backhaul link to a base station for effectuating content delivery to a plurality of mobile clients served by the base station in a mobile telecommunications network.

System 200A advantageously incorporates a client activity determination logic process or module 254 that is operative to determine when an ABR client is in a sleep phase, whereupon a certain amount of phantom payload packets may be generated to simulate the network contention on a communication link shared by a plurality of ABR clients. In order to differentiate legitimate sleep phases of the ABR duty cycle from extended periods of inactivity, a timer mechanism may be provided in conjunction with the client activity determination logic module 254. For example, if an ABR client has stopped playing, or lost connectivity (wired or wireless), paused, walked out of a subscriber premises, or roamed out of a coverage area (in a mobile environment), the client activity determination module 254 is operative to differentiate such an inactive period and send appropriate control signals to deactivate a phantom payload generation module or process 256. As will be described in further detail below, phantom packets (basically, blocks of transmission slots corresponding to certain amount of data, e.g., 2 kilobytes, 4 kilobytes, etc.) may be provided pursuant to "phantom tokens", which are requests for permission to transmit phantom packets, issued in respect of a network transmission thread (NTT) 252 that corresponds to an ABR client in sleep mode. When such phantom payload packets are generated, a bandwidth estimation module 258 is operative to account for the phantom payload information in estimating bandwidth allocations for other ABR clients having corresponding NTTs 252 in a multi-client environment that are not in their respective sleep phases. Because the remaining ABR clients are denied the opportunity to "hog" the extra bandwidth as per the bandwidth allocation process 260, they are locked into their respective bitrates for the duration of streaming sessions ("bitrate locking"). Optionally, any excess bandwidth may be allocated to a non-ABR client (where the multi-client environment includes one or more non-ABR clients) based on a replacement stage, if such a stage is selected or otherwise activated, which is provided as optional replacement stage block 262 of the system 200A.

Figure 2B:
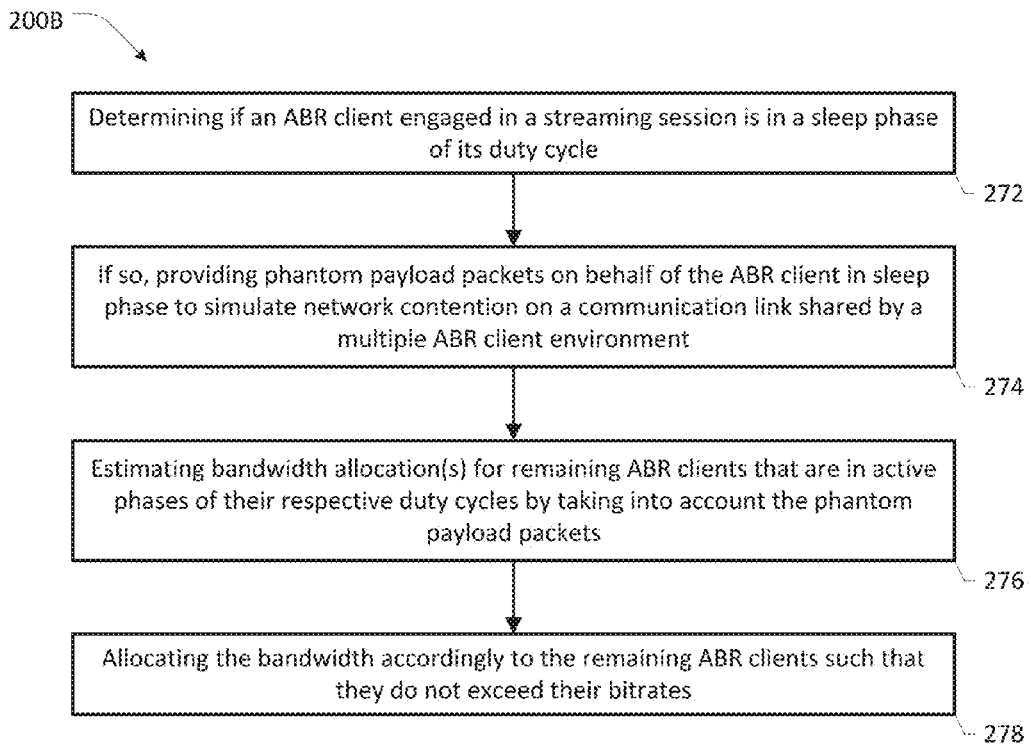
FIGS. 2B and 2C depict flowcharts relative to an illustrative process for managing bandwidth allocation in an implementation of the system of FIG. 2A.
Figure 2C:
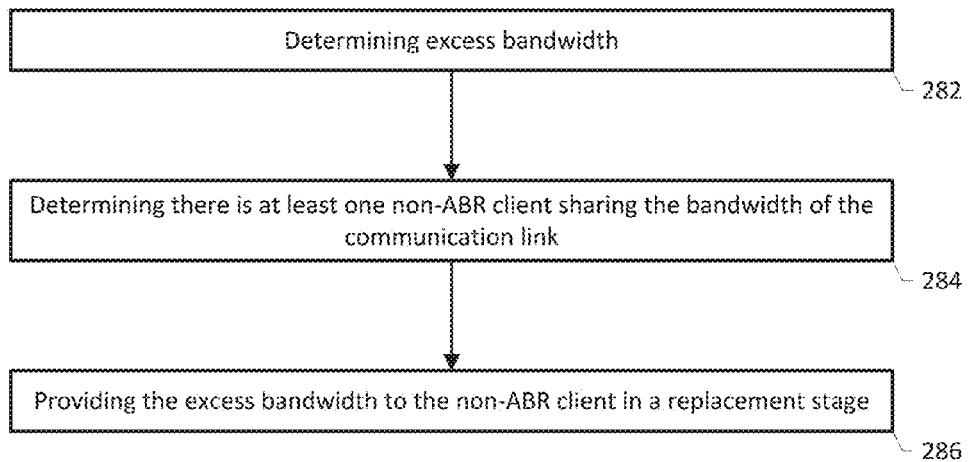

FIGS. 2B and 2C depict flowcharts relative to an illustrative process for managing bandwidth allocation in an implementation of the system of FIG. 2A. Process 200B of FIG. 2B is exemplary of a first stage process where phantom payload is provided for estimating network contention at full capacity and thereby mitigating the greedy behavior of ABR clients in a multi-client arrangement. Process 200C of FIG. 2C is exemplary of a second stage process where excess bandwidth may be allocated or assigned to a non-ABR client, if provided. At block 272, a determination is made if an ABR client engaged in a streaming session is in a sleep phase of its duty cycle. If so, an appropriate amount of phantom payload packets are provided on behalf of the ABR client in sleep phase to simulate network contention on a communication link shared by multiple ABR clients (block 274). At block 276, bandwidth allocation(s) to one or more remaining ABR clients that are active are estimated, preferably by taking into account the phantom payload packets. Thereafter, the bandwidth is allocated accordingly to the remaining ABR clients such that they do not exceed their bitrates (block 278).

If the multi-client environment includes one or more non-ABR clients, excess bandwidth may be allocated as set forth in process 200C. Where there is excess bandwidth, a determination may be made if there is at least one non-ABR client sharing the communication link (blocks 282, 284). If so, the bandwidth is provided to the non-ABR client in a replacement stage with respect to the phantom tokens provided in the first stage process (block 286).

It should be appreciated that processes 200B, 200C may be selectively activated, either separately or in combination, e.g., based on network operator selection. For instance, process 200B may be selectively implemented or activated where an example multi-client environment includes ABR clients and bitrate locking is desired so as to mitigate the effects of greedy ABR behavior. Where excess bandwidth is desired to be allocated to a non-ABR client, process 200C may be activated to operate in conjunction with process 200B. Accordingly, a hierarchical stage implementation may be provided to effectuate the foregoing processes in an example embodiment, wherein only process 200B is operative, both processes 200B and 200C are operative, or where neither is operative and the ABR clients continue to behave in conventional greedy manner.

Turning to FIG. 2D, depicted therein is an example system embodiment 200E that incorporates hierarchical token approval logic based on suitable queuing for managing bandwidth allocation and QoS of video delivery in a number of scenarios according to an implementation of system 200A set forth above. As pointed out before, embodiment 200E may be configured to be operative at a subscriber premises or in the network, depending on the application. Advantageously, system embodiment 200D incorporates a hierarchical token approval logic module (TALM) 210 wherein phantom tokens may be created so as to simulate the network contention that would exist if the ABR clients were to experience no peaks and valleys of a duty cycle. In other words, the sleep phases of an ABR client's duty cycle are "masked" such that the rest of the ABR clients are "tricked" into behaving as though there is no extra bandwidth made available. Once the phantom tokens/packets have been used for bandwidth calculation, they can be replaced with real network traffic, e.g., non-ABR traffic, in an optional replacement stage, if any bandwidth remains that would have otherwise been used by other opportunistic ABR clients to artificially inflate their video quality.

For purposes of the present patent application, a phantom token is a token that is not associated with any actual payload traffic of an NTT corresponding to a client's communication session. In accordance with the teachings herein, phantom tokens may be issued by leaf sequencer nodes in a nested/hierarchical WFQ arrangement when a parent node queries or polls its child sequencer node and the child sequencer node has not loaded a normal or regular token from a client session's NTT. Normally, if an NTT loads a token into an associated leaf sequencer, it is a real token or request for permission to transmit a chunk of actual payload data. If the NTT has not loaded a token into its corresponding leaf sequencer, e.g., because the client is not currently downloading a segment (i.e., sleep phase or sleep mode), then when the parent node queries the leaf sequencer of the ABR session, it will provide a phantom token to generate the illusion that the client is downloading rather than "resting" in the sleep phase of its duty cycle.

A plurality of NTTs 202-1 to 202-K associated with multiple client sessions, e.g., media streaming sessions involving one or more ABR clients, and optionally, one or more non-ABR clients, are illustratively provided, which may be stored in a suitable storage area or memory associated with system 200D. A plurality of leaf sequencers 204-1 to 204-N are configured to receive transmission request tokens from one or more NTTs. In one embodiment, there may be exactly one leaf sequencer per "transmission class" of communication flows or sessions. For example, the transmission class for a leaf sequencer may be configured based on a client's IP address. That is, if one client is trying to download multiple segments, they must share the same leaf sequencer. A transmission class may also be configured based on a session ID of a communication session, flow or stream IDs, QoS level, Class of Service (CoS) level, group ID of devices, source/destination IP addresses, and the like. For example, one client may be assigned a different priority based on the type of video content. In that case, the transmission class may be identified by a session ID. In the case of data download, it could be a session ID associated with a download of data or a session ID for a particular gaming session, as an example. Accordingly, in some embodiments, leaf sequencers 204-1 to 204-N may represent individual devices in a subscriber premises or a group of mobile devices being served by a base station for video delivery. In other embodiments, the leaf sequencers may represent on-demand video assets from various content sources, and the like.

In one arrangement, hierarchical TALM 210 may be implemented as a nested two-stage approval framework or scheme with selectively activatable components. A first stage component 212 is configured to receive: (i) phantom tokens from leaf sequencers servicing NTTs that correspond to one or more ABR clients in inactive phases of their respective traffic download duty cycles, (ii) regular tokens from leaf sequencers servicing NTTs that correspond to one or more ABR clients in active phases of their respective traffic download duty cycles, and/or (iii) regular tokens from leaf sequencers servicing NTTs that correspond to one or more non-ABR clients continuously pulling data for respective communication sessions. A second stage component 216 operating selectively in conjunction with the first stage component 212 is provided for receiving only regular tokens. Such regular tokens are the same regular tokens provided to the first stage component 212, i.e., (i) tokens from leaf sequencers servicing NTTs that correspond to one or more ABR clients in active phases of their respective traffic download duty cycles, and/or (ii) tokens from leaf sequencers servicing NTTs that correspond to one or more non-ABR clients continuously pulling data for respective communication sessions. In one variation, the structure and functionality of the first stage component 212 may be selectively inactivated via suitable feature selection control signals, e.g., from a network operator, when the functionality of utilizing phantom tokens/packets in bandwidth estimations or computations is not needed in a network. That is, the first stage component 212 may be bypassed when inactivated, in which case only the token approval logic of the second stage component 216 is operative for servicing the tokens emanating from the NTTs 202-1 to 202-K. Likewise, the second stage component 216 may be selectively bypassed (e.g., where are there no non-ABR clients or where bandwidth allocation to a replacement client is desired), whereby only the first stage component 212 is operative (provided it has been selected) for providing bitrate locking with respect to the ABR clients.

Because the first stage component 212 is configured to receive phantom tokens, it may be referred to as a phantom-enabled token approval stage. Likewise, the second stage component 216 may be referred to as normal token approval stage (when operating solely) and/or replacement token approval stage (when operating in conjunction with the phantom-enabled token approval first stage 212). To ensure fairness at both stages of the token approval framework, each stage may be provided with its own accounting log module for reconciling tokens being submitted for selection. Accordingly, a first accounting log module 214, which may be referred to as a phantom-enabled accounting log module, and a second accounting log module, which may be referred to as a replacement or normal accounting log module, are provided in association with the first and second stage components 212, 216, respectively.

As previously described, normal or regular tokens are loaded by NTTs into corresponding leaf sequencers, which tokens are illustrated in FIG. 2 by reference numerals 206 and 208. The loaded leaf sequencers are configured to provide the normal tokens to both first and second stage components 212, 216 (if the first stage component 212 has not been inactivated). If the phantom token-based bandwidth management feature is enabled, the "unloaded" leaf sequencers are configured to provide phantom tokens (i.e., when an NTT has not loaded a token because the corresponding client device is in an inactive or sleep phase of its duty cycle) to the first stage component 212. Thus, it should be appreciated that only the first stage component 212 is operative to receive the phantom tokens as well as normal or regular tokens, whereas the second stage component is operative to receive only the regular tokens. By way of illustration, reference numeral 222A refers to a phantom token and reference numeral 224A refers to a normal token provided to the first stage component 212 by respective leaf sequencers. On the other hand, whereas the second stage component 216 receives the same normal token, as illustrated by reference numeral 224B, it does not receive a phantom token corresponding to the phantom token 222A provided to the first stage component 212 by the leaf sequencer. Instead, a "no token" indicator 222B is illustrated with respect to the second stage component 216, although a communication path is illustratively provided between the leaf sequencer and the second stage that is operative provide a normal token when that particular leaf sequencer is loaded therewith.

Figure 3:
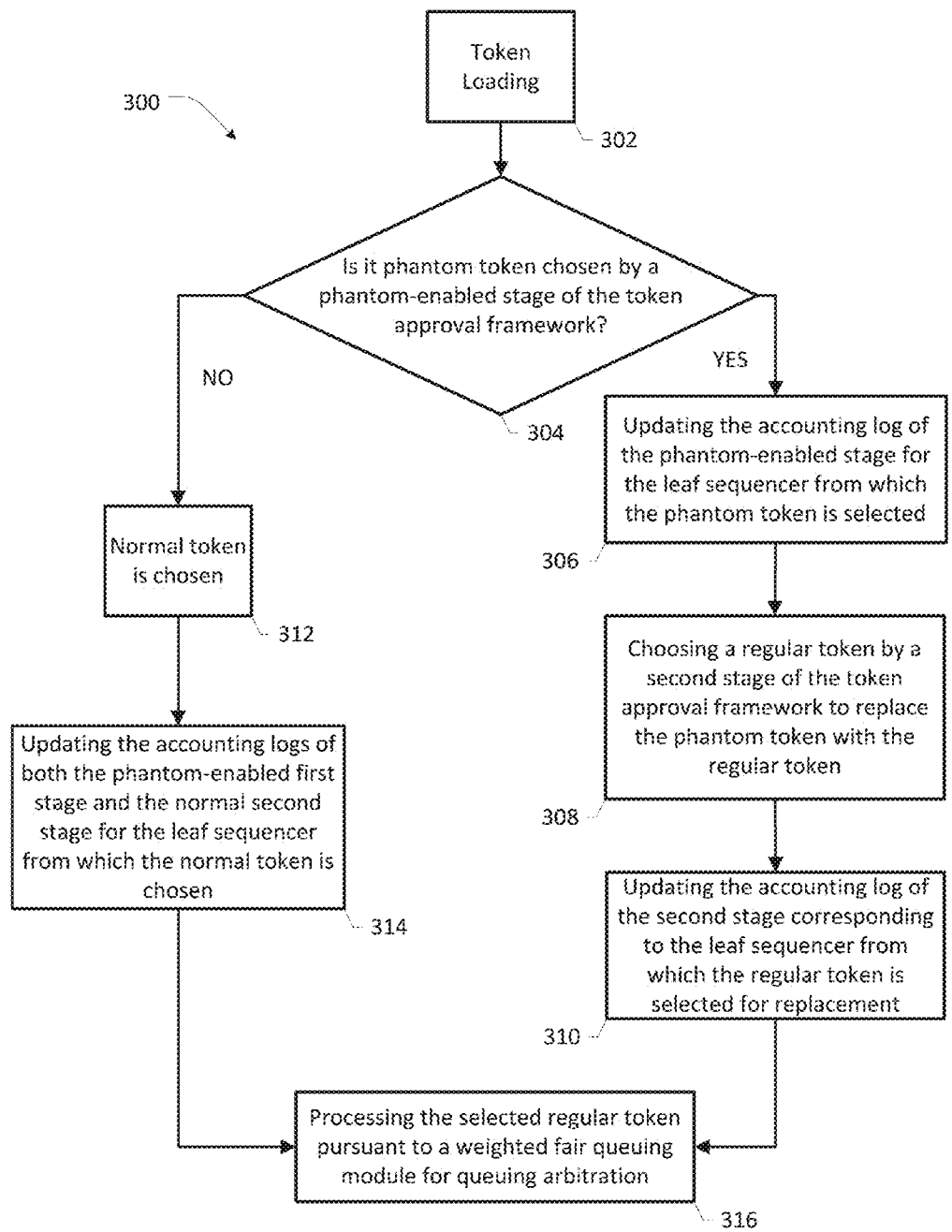
FIG. 3 is a flowchart of an illustrative process for hierarchical token approval logic involving phantom tokens and associated token accounting in an implementation of the system of FIG. 2D.

A token approval and reconciliation logic module 220 is coupled to the first and second stage components 212, 216 for effectuating a dual accounting system with respect to the tokens, normal and phantom, being submitted for approval, which may be queued according to a number of schemes, e.g., a weighted fair queuing (WFQ). Turning to FIG. 3, depicted therein is a flowchart of an illustrative process 300 for hierarchical token approval logic and associated token accounting, i.e., reconciliation, involving the dual stages or layers of system 200, assuming both stages are activated. Upon receiving the normal and phantom tokens for submission (block 302), if the first stage component 212 chooses a phantom token (block 304), the accounting/reconciliation logic will "bill" the leaf sequencer from which the phantom token is selected. That is, an entry corresponding to the leaf sequencer in the accounting log 214 of the first stage component 212 will be updated to indicate that the particular leaf sequencer and/or its NTT has been selected in that round (block 306). Thereafter, the second stage component 216, acting as a replacement layer, chooses a non-phantom or normal token to replace the phantom token (block 308). Preferably, the non-phantom token selected for replacement is from a leaf sequencer associated with an NTT corresponding to a non-ABR client. The reconciliation logic then bills the leaf sequencer from which the regular token is selected for replacement, in its accounting log module 218. That is, an entry in the accounting log module 218 corresponding to the leaf sequencer and/or its NTT from which the regular token is selected is updated to indicate its selection (block 310). On the other hand, if the first stage component 212 chooses a normal token (blocks 304 and 312), then the reconciliation logic will bill the leaf sequencer in both accounting logs 214 and 218 (block 314). Regardless of whether normal tokens are initially selected or selected for replacement of phantom tokens, the tokens are processed as per a suitable queuing module for arbitration (block 316).

Returning to FIG. 2D, a queuing logic module 232A/232B may be included with the first stage component 212, or the second stage component 216, or both, to facilitate token selection process depending on selective activation of the components as described hereinabove. In one example implementation, the queuing functionality is based on WFQ-ing and may be configured to perform an approval process based on computing the following expression and approving a token from a transmission queue that is minimum function of the following expression:

$$x\_i = (A\_i + Tb\_i)/w\_i$$

where:
- $x\_i$ is an intermediate value representing the estimated completion time for accounting queue i in an imaginary bitwise round-robin model;
- $Q\_i$ = transmission queue;
- $A\_i$ = sum($Qa\_ik$);
- $Qa\_ik$ = a quantity of bytes for a previously-approved token k from queue $Q\_i$;
- $Qt\_ik$ = the time when the token k from queue $Q\_i$ was approved for transmit;
- $Tb\_i$ = the number of bytes for the current token from queue $Q\_i$; and
- $w\_i$ = weight factor for queue $Q\_i$.

Thus, $A\_i$ is the sum of the bytes already transmitted for queue i within an "accounting window". $A\_i + Tb\_i$ adds in the number of bytes for a candidate token. The weight $w\_i$ corresponds to a "speed" for the transmission queue relative to other weighted streams. By comparing the $x\_i$ values for the various queues, it can be determined which payload packet will finish transmitting first in the imaginary bitwise round-robin scheme. That payload packet is chosen for transmission. Accordingly, the token from the queue $Q\_i$ is approved where $x\_i = \min(x\_i)$. A local accounting database may be provided for keeping track of the variables employed in the transmission queuing process set forth above, wherein the tokens may be reconciled according to weight.

Optionally, a rate limiter 236 may be provided in an embodiment of system 200 to further refine or throttle the bandwidth after an NTTs token is approved for transmission of a chunk of the NTTs payload on the link. The rate limiter 236 may also be configured to allow an operator to implement or enforce a bandwidth policy (e.g., a subscriber household only pays for a specific bandwidth service; for instance 2 gigabits/second service, 1 gigabit/second service, etc.).

Figure 7:
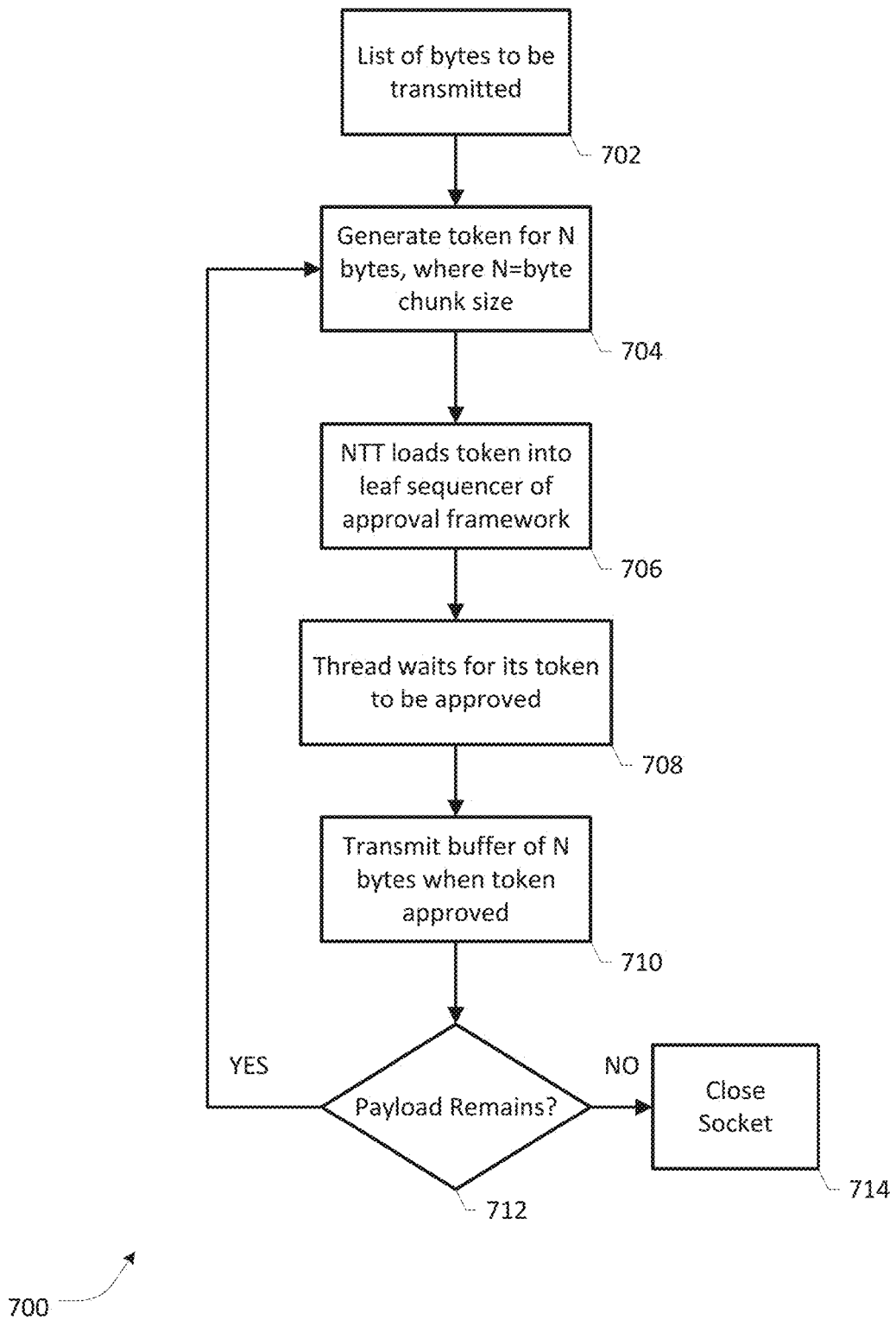
FIG. 7 is a flowchart of an illustrative token approval loop that may be iteratively executed for transmission of payload data from a plurality of network transmission threads (NTTs) corresponding to different client devices.

Typically, the hierarchical token approval process and arbitration of selected tokens for transmission queuing may be performed in multiple iterations for each NTT as long as there is payload data to be transmitted. An approval loop process 238 is illustratively shown in FIG. 200D to indicate the iterative nature of the selection, arbitration, and transmission aspects of system 200, which is further exemplified in FIG. 7 for a single thread. Reference numeral 700 refers to a flowchart of an illustrative token approval loop that may be iteratively executed for transmission of payload data from a plurality of NTTs corresponding to different client devices. At block 702, an NTT lists a number of bytes to be transmitted on the link. At block 704, the system generates a token for a specified amount of payload data, e.g., N bytes, where N equals the byte chunk size. At block 706, the token for the thread is loaded into the hierarchical approval framework described hereinabove. At block 708, the thread waits for its token to be approved. Once the token is approved, the N bytes are transmitted on the link as set forth at block 710. At decision block 712, the system determines whether any payload remains to be transmitted. If not, the approval loop 700 proceeds to block 714 where the transmission socket is closed. On the other hand, if the payload remains, process 700 loops back to block 704 where additional tokens may be generated for corresponding chunks of data. As noted previously, the foregoing approval loop process may take place for multiple transmit buffer threads, each submitting respective tokens to the approval framework as needed.

Figure 4:
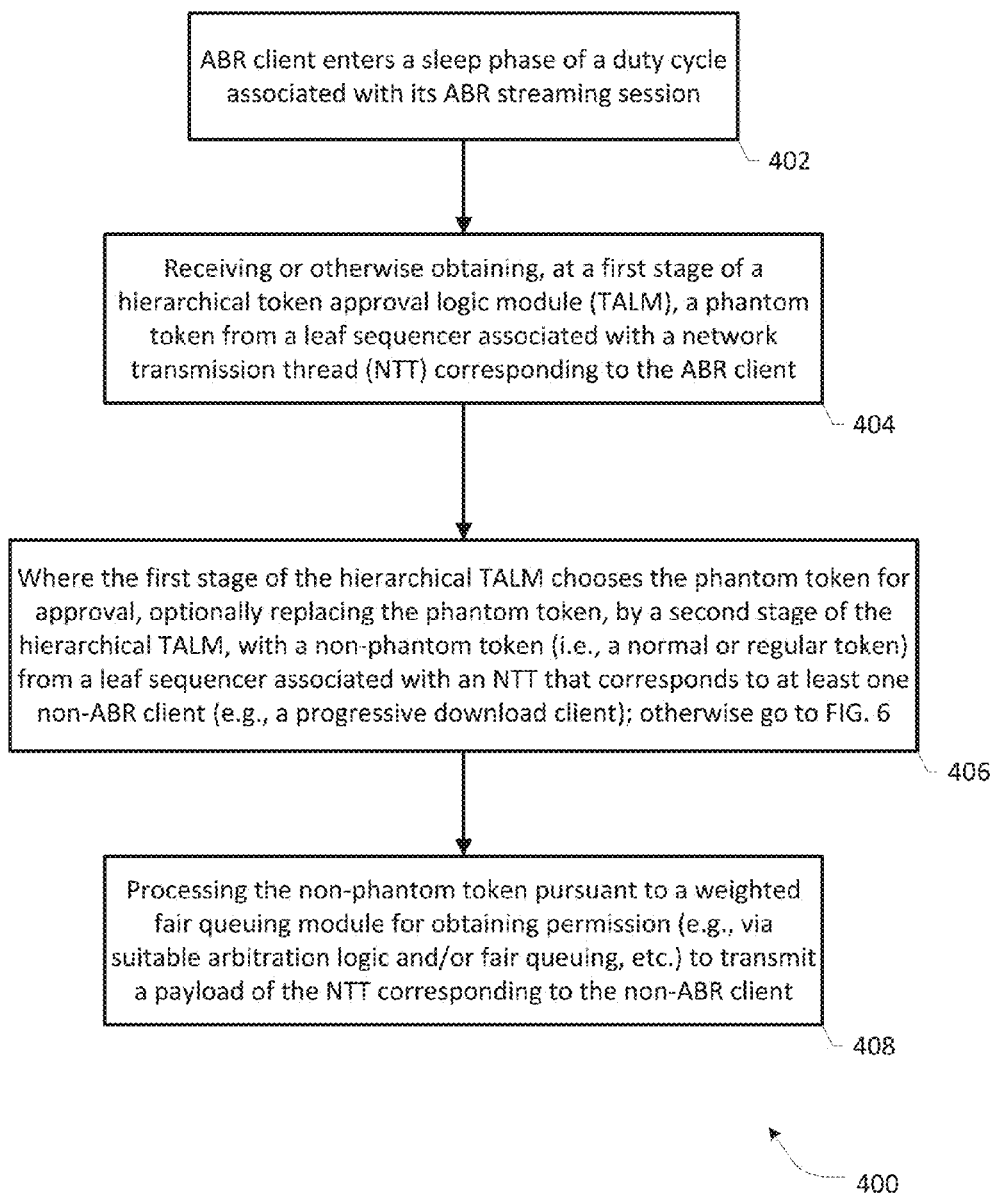
FIG. 4 is a flowchart of an illustrative process invoking an embodiment of the hierarchical token approval logic for mitigating QoS "thrashing" that may be caused by greedy download behavior of an ABR client during the duty cycles of other ABR clients.

FIG. 4 is a flowchart of an illustrative bandwidth management process 400 involving an embodiment of the hierarchical token approval logic for mitigating QoS thrashing that may be caused by greedy download behavior of an ABR client during the duty cycles of other ABR clients, including mobile ABR devices. At block 402, at least an ABR client enters a sleep phase of a duty cycle associated with its ABR streaming session. At block 404, a first stage of an embodiment of the hierarchical token approval logic module (TALM) set forth above receives a phantom token from a leaf sequencer associated with the NTT corresponding to the at least one ABR client. Responsive to the phantom token, a specific amount of phantom payload packets are used for bandwidth estimation purposes. If the first stage of the hierarchical TALM chooses the phantom token for approval, the phantom token is optionally replaced by a second stage of the hierarchical TALM, if the second stage has been activated, with a non-phantom token (e.g., a normal token) from a leaf sequencer associated with an NTT corresponding to a non-ABR client, as set forth at block 406. Otherwise, another branch of the token reconciliation logic may take place, as will be set forth below in reference to FIG. 6 with respect to a normal token being selected by the first stage. Continuing with the process flow of FIG. 4, the method proceeds to block 408, where the non-phantom token selected for replacement pursuant to a queuing module associated with the second stage is processed for obtaining permission to transmit a payload of the NTT corresponding to the non-ABR client, if included in the subscriber premises. It should be appreciated that as the link bandwidth consumption is at least roughly maintained (due to allocation of "excess" bandwidth to one or more non-ABR clients), the remaining ABR clients are prevented from proactively inflating their bitrates and experiencing sudden QoS changes.

Figure 5:
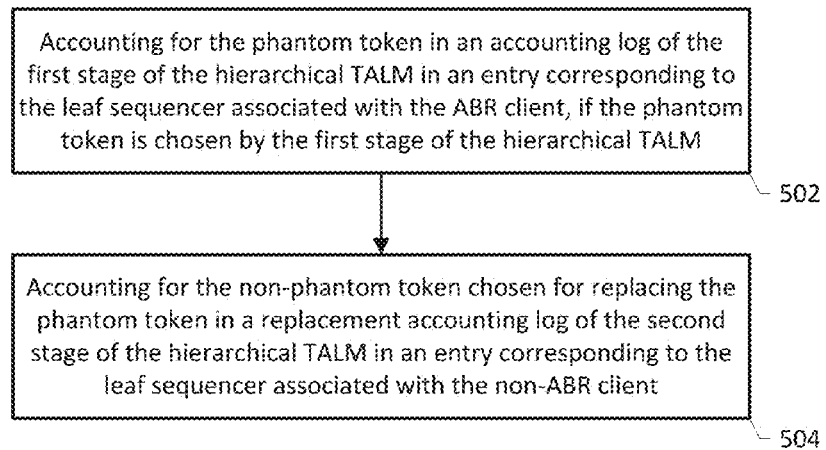
FIGS. 5 and 6 depict flowcharts of additional aspects that may be practiced in combination with the process of FIG. 4.

FIG. 5 depicts a flowchart of an embodiment of a dual accounting logic process 500 that may be practiced in combination with the process of FIG. 4 when a phantom token is selected. At block 502, the phantom token is accounted for in an accounting log of the first stage of the hierarchical TALM in an entry corresponding to the leaf sequencer associated with an ABR client disposed in sleep mode. After selecting a non-phantom token for replacement, it is accounted for in a replacement accounting log, i.e., a second accounting log, of the second stage of the hierarchical TALM, in an entry corresponding to the leaf sequencer associated with the non-ABR client, as set forth at block 504.

Figure 6:
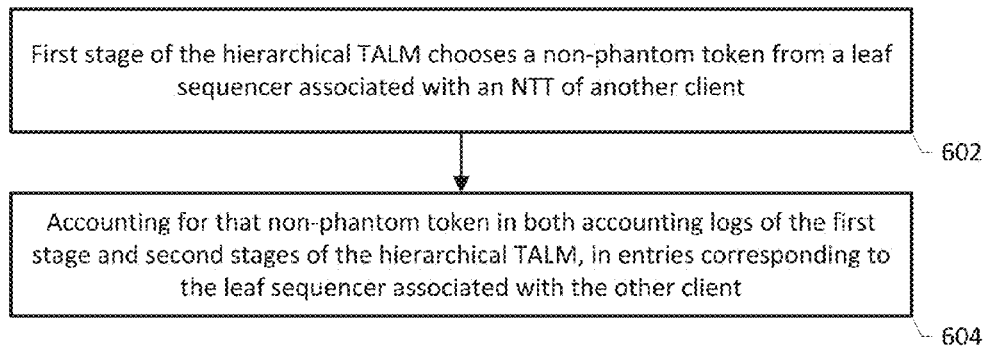

FIG. 6 depicts a flowchart of another embodiment of a dual accounting logic process 600 that may be practiced in combination with the process of FIG. 4 when a normal token is selected by the first stage component of the hierarchical TALM. As set forth at block 602, the normal token may be from a leaf sequencer associated with another client (e.g., preferably a non-ABR client, although a policy-based client selection may operate to choose another ABR client in non-sleep mode, if so desired in an additional/alternative implementation). At block 604, the normal token is billed in both accounting logs of the first and second stages of the TALM, in respective entries corresponding to the leaf sequencer associated with the client.

One skilled in the art will recognize that the accounting log modules, e.g., accounting logs 214, 218, of the first and second stage components 212, 216 of an embodiment of system 200 may be implemented in suitable persistent non-volatile memory, using any known or heretofore unknown data structures. For example, each accounting log may maintain, inter alia, leaf sequencer identifiers, NTT and/or transmission class identifiers, and corresponding indicators operative to indicate when a token, phantom or normal, from a particular NTT or leaf sequencer is selected. Further, because the first and second stages of the TALM may be selectively activated as discussed above, the token reconciliation and accounting processes set forth herein (e.g., in FIGS. 3-6) may be selectively combined or divided into processes corresponding to the selective configuration of the two stages. In addition, although a hierarchical TALM arrangement has been particularly exemplified in implementing the system of FIG. 2A, the overall concept of using phantom payload packets on behalf of an inactive ABR client for bandwidth and bitrate locking with respect to remaining ABR clients may be implemented using other methods. For example, each NTT could run a WFQing process involving locking and a uniform algorithm on the accounting logs and determine whose turn it is for transmission. If one specific NTT determined that its turn had come, it would update the accounting logs and transmit some payload data, i.e., without a separate approval thread. It should be appreciated that such a single thread queuing logic may also be used in implementing the system of FIG. 2A.

Figures 8A, 8B, 8C:
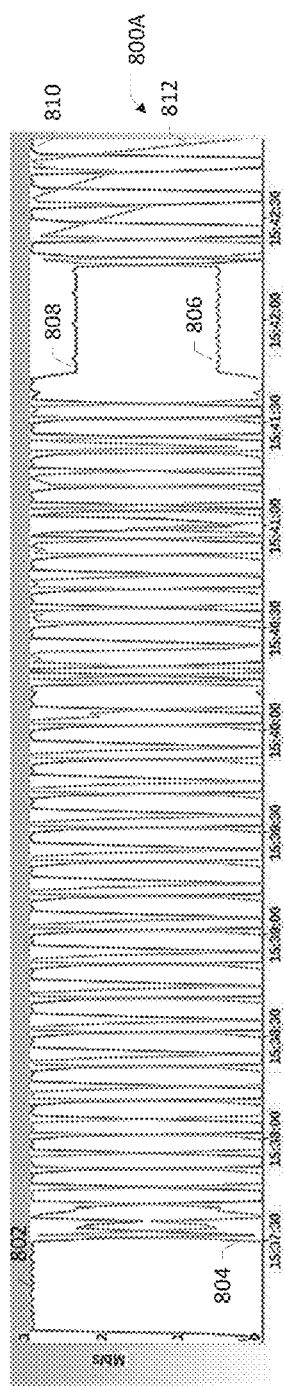
FIGS. 8A-8C depict example screenshot panels where the mitigating effects of an implementation of the systems of FIGS. 2A/2D may be illustrated.

Turning now to FIGS. 8A-8C, example screenshot renditions are depicted in respective panels 800A-800C where the mitigating effects of an implementation of the system of FIG. 2 may be illustrated. Panel 800A of FIG. 8A is representative of two ABR clients engaged in respective sessions in a streaming environment based on conventional WFQing in a sample delivery pipe, which in the example scenario is provided at 3 Mbs. Device 1 having a priority weight value of 1.75 is initially playing the ABR video at full bandwidth allocated, i.e., at 3 Mbs, as shown by trace portion 802. Thereafter, a lower priority ABR device, e.g., Device 2 having a priority weight value of 0.353, joins, as shown by trace portion 804. The available bandwidth is now allocated between the two devices, Device 1 having 2.496 Mbs and Device 2 having 0.504 Mbs, for example, with sample video bitrates in the manifest being 2 Mbs, 1.6 Mbs, 1.2 Mbs, 900 Kbs, 600 Kbs and 300 Kbs. As the two devices exhibit respective duty cycles, they may follow a pattern when the two duty cycles become substantially out of sync (e.g., with 180° out-of-phase where the peaks and valleys of the two cycles are essentially reversed). Under conventional WFQing, Device 2 exhibits aggressive behavior to move in bitrate, illustrated by trace portion 806, when the duty cycle of Device 1 is entering in a sleep phase, illustrated by trace portion 808. However, while the lower weighted Device 2 moves up in QoS initially, its bitrate gets knocked back down as a result of the duty cycle of Device 1, whereupon its attempted buffer flush and refill with higher bitrate segments is thwarted. After a jittery phase, both Device 1 and Device 2 may settle into respective duty cycles again or may continue to experience erratic swings, as illustrated by trace portions 810 and 812, respectively.

Panel 800B of FIG. 8B is representative of a scenario where the feature of phantom packet-based nested WFQing is activated in a two-ABR client environment. As before, Device 1 having a priority weight value of 1.75 initially pulls the data playing the ABR video at full bandwidth allocated, i.e., at 3 Mbs, as shown by trace portion 822. When the lower priority Device 2 (having a priority weight value of 0.353) is joined, its bitrate is brought to a level 824 that is maintainable in accordance with its manifest, with the total bandwidth being constrained within the 3 Mbs pipe. After a period of settling, both Device 1 and Device 2 exhibit respective duty cycles 826, 828, wherein any aggressive attempt at consumption of excessive bandwidth is curtailed. Because neither device is aggressive during the sleep periods of the other device, both devices exhibit a duty cycle maximum that is allowed under or otherwise consistent with their respective manifests, priorities, and the like. Thus, it can be seen that neither device reaches the full bandwidth of the 3 Mbs pipe. Instead, both devices are locked into their respective correct bitrates throughout the video sessions regardless of ABR duty cycles, thereby resulting in a more consistent QoS and better video experience.

A scenario where a non-ABR client is deployed in addition to an ABR client is illustrated in Panel 800C of FIG. 8C, again with the feature of phantom packet-based nested WFQing being activated. While the ABR client, i.e., Device 1, is initially ramped up to the maximum available bandwidth, as shown by trace portion 852, it is brought back to a more predictable duty cycle 856 having correct bitrates that are locked in for the entire duration of its session. When the non-ABR client (e.g., having a priority weight value of 0.175) joins, after an initial phase 854, it ramps up the download rate to the maximum available amount. Because of the duty cycle of Device 1, the non-ABR client will be allocated all available bandwidth only when the ABR client is not active while in its duty cycle. Accordingly, the non-ABR client shows a periodic pattern 858 in its bandwidth, with the maximums reaching the full pipe. One skilled in the art will therefore recognize that any bandwidth savings realized by implementing the innovative features of the present disclosure, it may be efficiently (re)allocated to other devices sharing the delivery pipe, thereby resulting in more optimized bandwidth utilization.

Figure 9:
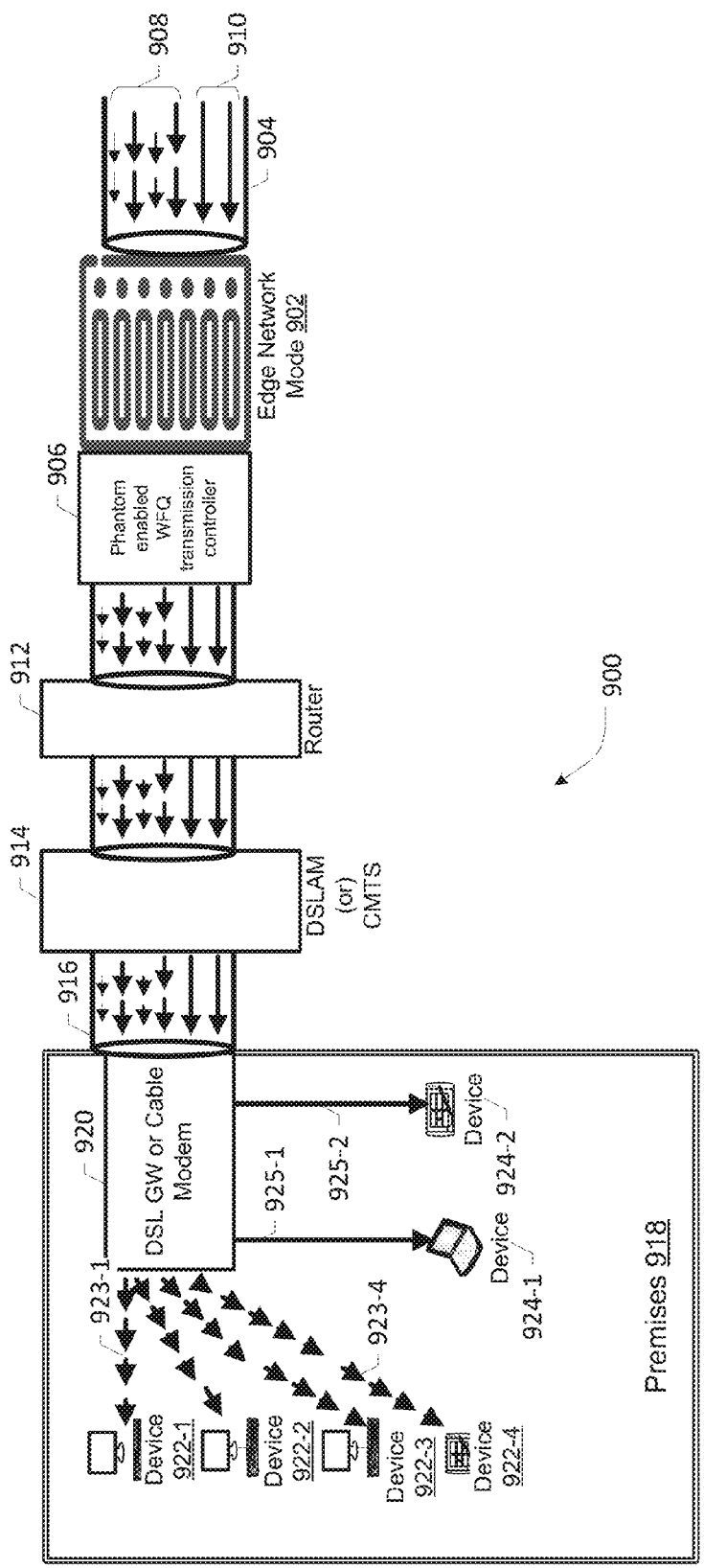
FIGS. 9 and 10 depict an example DOCSIS or DSL network arrangement serving a subscriber premises wherein an embodiment of the present invention may be practiced at a network node or at a premises node associated with the premises.

It should be further recognized that the innovative features set forth herein may be provided, in a network node implementation, as a nested WFQing bandwidth transmission controller associated with, e.g., an adaptive streaming sever or a suitable network proxy, for managing the bandwidth, including efficient utilization, of a virtual delivery pipe. FIG. 9 depicts an example DOCSIS or DSL network arrangement 900 serving a subscriber premises 918 wherein an embodiment of the present invention may be practiced at an edge network node or proxy 902. An incoming broadband pipe 904 is operatively coupled to the network node/proxy 902 for facilitating distribution of various ABR and non-ABR content from one or more content sources or providers. By way of example, ABR content flows are illustratively shown as a group of broken arrows 908 while the non-ABR content flows, to the extent there are non-ABR clients provided in premises 918, are shown as arrows with unbroken lines 910. A phantom packet-enabled WFQ bandwidth transmission controller 906 embodying an implementation of system 200 is operatively associated with or otherwise provided at the network proxy 902 for managing a delivery pipe 916 of certain bandwidth (e.g., a 15 Mbs virtual pipe) that serves the premises 918.

As pointed out previously, subscriber premises 918 may be a home, building, campus, organization, etc., served by a suitable premises node 920 (e.g., a DSL gateway (GW) for DSL or a cable modem for DOCSIS/CMTS), which may be coupled to a plurality of subscriber devices, e.g., customer premises equipment or CPE, via a premises network (not specifically shown) that may comprise a wireless and/or wireline communications network operating with suitable protocols (e.g., Ethernet and/or WiFi). By way of illustration, such CPE may comprise ABR client devices as well as optional non-ABR client devices. Example ABR clients may include devices 922-1 to 922-4 wherein device 922-1 may be an OTT/STB ABR player session with a priority weight of 1.0, device 922-2 may be a gaming device ABR player session with a priority weight of 3.0, device 922-3 may be an smart Blu-Ray ABR player session with a priority weight of 1.75, and device 922-4 may be a tablet ABR player session with a priority weight of 0.75, each of which is operatively coupled to the premises node 920 via respective communication paths 923-1 to 923-4. Example bitrates of ABR client devices 922-1 to 922-4 can be 5.084 Mbs, 5.084 Mbs, 2.966 Mbs and 1.2712 Mbs, all sized to fit within the delivery pipe 916. Optional non-ABR clients may include device 924-1 that may be a laptop engaged in a non-ABR download session with a priority weight of 0.175 and device 924-2 that may be another laptop or tablet engaged in a non-ABR download session with a priority weight of 0.175. The optional non-ABR clients 924-1, 924-2 are also coupled to the premises node 920 via suitable communication paths 925-1, 925-2, respectively. Example bitrates of both non-ABR client devices 924-1, 924-2 may be 0.2966 Mbs, also sized to fit within the bandwidth of the delivery pipe 916.

When an ABR client of the premises 918 enters a sleep phase of its duty cycle, the transmission controller module 906 is operative to engage in a phantom token-based approval logic process and associated phantom packet-based bandwidth calculation as discussed above for effectuating allocation of the available bandwidth of the delivery pipe 916. Whereas the ABR client devices are always locked into their respective bitrates, the non-ABR clients devices, where included, may experience oscillations responsive to the additional bandwidth that may become available depending on the net/cumulative effect of the duty cycles of the ABR clients.

Figure 10:
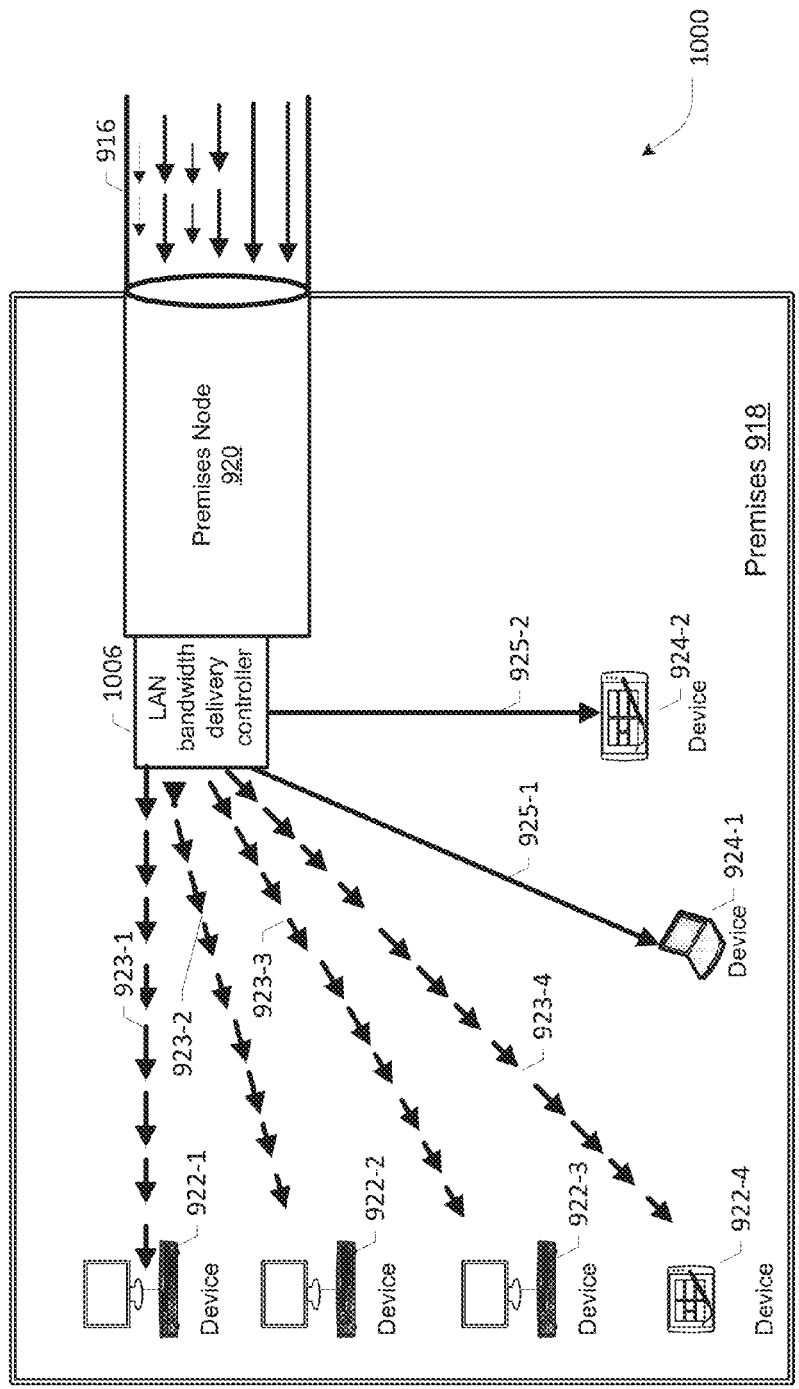

In another implementation, the innovative features of the present disclosure may be provided as a phantom packet-based WFQing LAN bandwidth delivery controller associated with a premises node. FIG. 10 depicts an example premises-side portion 1000 of a DOCSIS or DSL network arrangement (e.g., network arrangement 900 shown in FIG. 9) including premises 918 wherein an embodiment 1006 of the present invention may be practiced at or in association with the premises node 920. As the configuration of premises 918 is the same in both arrangements of FIGS. 9 and 10, the description of the premises and associated client devices set forth above is equally applicable here, mutatis mutandis. By implementing an embodiment of the phantom token-based approval framework and associated bandwidth calculation, the controller 1006 is operative to modulate the respective individual sessions' bandwidth so as to size the premises' LAN virtual pipe appropriately that is consistent with the incoming delivery pipe 916.

Figure 11:
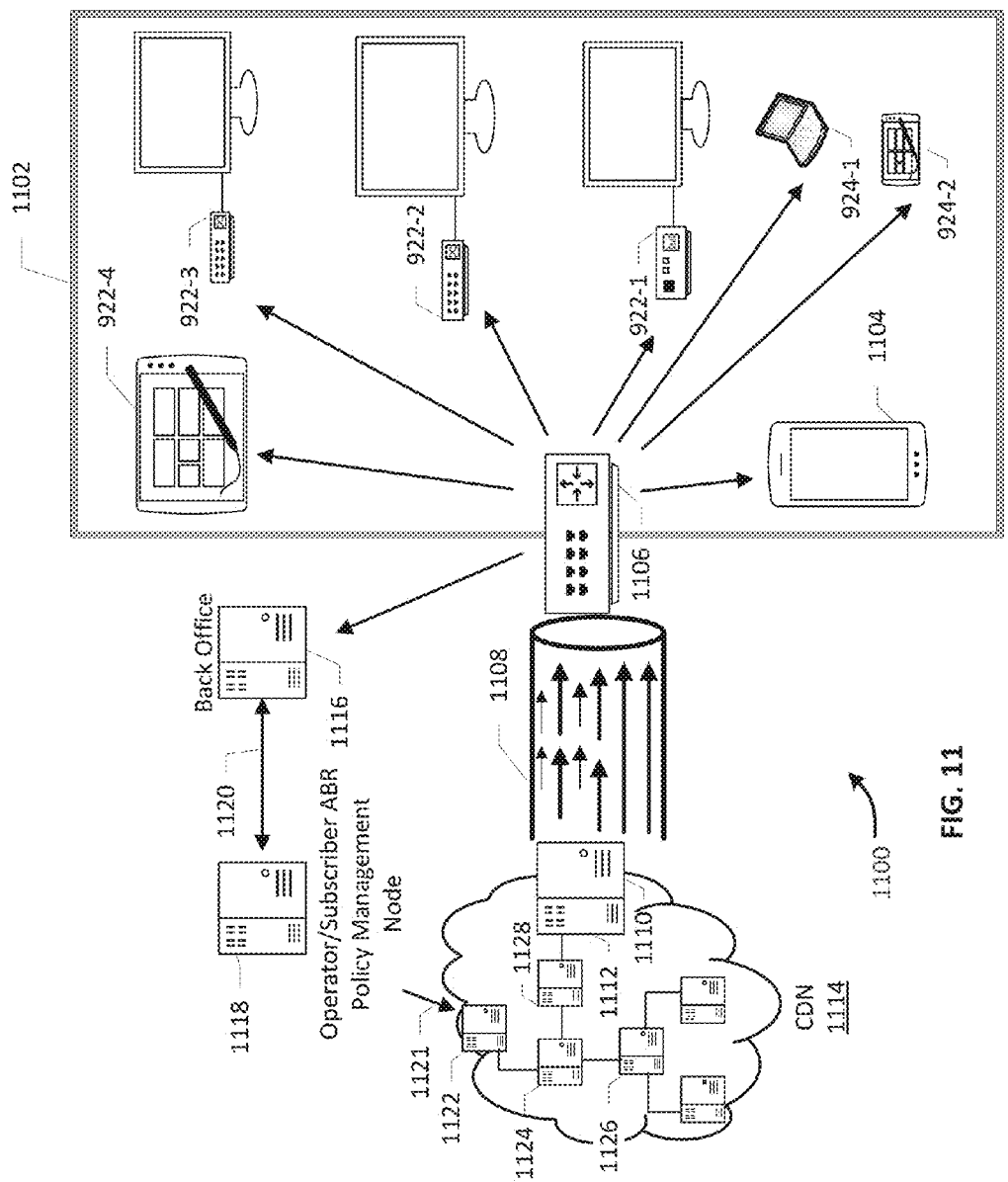
FIG. 11 depicts an example CDN arrangement serving a subscriber premises wherein an embodiment of the present invention may be practiced at a delivery edge network node.

In a still further implementation, FIG. 11 depicts an example CDN environment 1100 serving a subscriber premises 1102 wherein an embodiment of the present invention may be practiced at or in conjunction with a delivery edge network node 1112. For purposes of the present patent application, a CDN 1114 may comprise an overlay network architected for high-performance streaming of a variety of digital assets or program assets as well as services (referred to as "content" herein) to subscribers using one or more Internet-based infrastructures, private/dedicated infrastructures or a combination thereof. In general, the terms "content" or "content file" as used in reference to at least some embodiments of the present patent disclosure may include digital assets and program assets such as any type of audio/video content or program segment, streaming or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using ABR streaming session and/or non-ABR progressive download sessions. In general, the overlay architecture of CDN 1114 may include a multi-level, hierarchically-organized interconnected assembly of network servers for providing media pathways or "pipes" from one or more central distribution nodes to one or more levels of regional distribution nodes that are connected to one or more local edge servers configured to serve a plurality of end users or subscribers in respective serving location areas. In addition to such "distribution servers" (sometimes also referred to as "surrogates"), CDN 1114 may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of the associated back office infrastructure. In FIG. 11, an example subscriber/operator management system 1118 is deployed in conjunction with a back office node 1116, with a suitable communication interface 1120 provided therebetween. Additional back office infrastructure may include operator pipe and content policy node(s), subscriber device profile and priority definition node(s), in addition to streaming policy server node(s), billing node(s) and a subscriber authentication node(s), which are not explicitly shown in FIG. 11 for clarity reasons. 136. A bandwidth decision manager and associated scheduler may be configured to use data from the operator pipe and content policy node as well as the subscriber device profile and priority node to regulate bandwidth allocated to the CDN distribution pipes for carrying groups of content streams to the subscribers. Additional details with respect to allocating bandwidth on an outgoing CDN distribution pipe based on weights and priority levels associated with subscriber devices, content-based policies, dynamic resizing of the pipes using, e.g., one or more pipe control nodes, and scheduling based on WFQ techniques, may be found in one or more of the following commonly owned U.S. patent application(s) and/or patents: (i) "REGULATING CONTENT STREAMS FROM A WEIGHTED FAIR QUEUING SCHEDULER USING WEIGHTS DEFINED FOR USER EQUIPMENT DEVICES", application Ser. No. 13/597,333, filed Aug. 29, 2012, in the name(s) of Charles Dasher et al., published as U.S. Patent Application Publication No. 2014/0068076; (ii) "METHODS AND APPARATUS FOR MANAGING NETWORK RESOURCES USED BY MULTIMEDIA STREAMS IN A VIRTUAL PIPE", application Ser. No. 14/013,479, filed Aug. 29, 2013, in the name(s) of Robert Forsman et al., published as U.S. Patent Application Publication No. 2013/0346568; and (iii) "METHODS AND APPARATUS FOR MANAGING NETWORK RESOURCES USED BY MULTIMEDIA STREAMS IN A VIRTUAL PIPE", application Ser. No. 13/403,075, filed Feb. 23, 2012, in the name(s) of Robert Forsman et al., issued as U.S. Pat. No. 8,549,570, which are incorporated by reference herein.

In the example CDN arrangement 1100 of FIG. 11, subscriber premises 1102 is configured substantially similar to the premises 902 described hereinabove and will not be described in further detail here, except that a home gateway 1106 is operative to communicate with back office 1116 in some embodiments. Further, subscribes premises 1102 is configured to include a wireless phone 1104 having ABR streaming capability for downloading ABR content at a certain priority weight value. Accordingly, phone 1104 comprises one of the ABR client devices that may also exhibit a duty cycle behavior described above.

CDN 1114 is exemplified with a redirector node 1122 and a central origin server node 1124 that is operative to distribute content to a plurality of regional nodes, e.g., nodes 1126, 1128, and ultimately to various edge/delivery nodes serving subscribers at different geographic locations, based on subscriber policies. An example subscriber policy with respect to the subscriber premises 1102 may comprise:

Subscriber 1 Policy:
Physical To-Home Pipe: 10 Mbs
Sony 46"/Sony Blu-Ray: Wt 3.0-4.426 Mbs—Session ID 1
LG 32" TV//Bluray-Player: Wt 1.75-2.58 Mbs—Session ID 2
Tablet: Wt 0.75-1.196 Mbs—Session ID 3
SD TV/OTT STB Priority 3 Wt 0.75-1.196 Mbs—Session ID 4
Phone: Wt 0.352-0.519 Mbs—Session ID 5
Non-ABR Data: Wt 0.175-0.258 Mbs—Session ID 6 which may be provided by the operator/subscriber policy management node 1118 to the redirector node 1122 via a suitable communication path 1121. By way of illustration, an edge delivery node 1112 serving subscriber premises 1102 is hierarchically coupled to regional node 1128. In accordance with the teachings of the present disclosure, a phantom token-based WFQing bandwidth transmission controller 1110 is operative in association with the edge delivery node 1112 for managing the bandwidth allocation in respect of a dynamic virtual pipe 1108 provided to the home gateway 1106 for delivering various types of content in ABR download sessions or non-ABR download sessions to respective client devices. As described before, when an ABR client device of the premises 1102 enters inactive phases of its duty cycle, the bandwidth transmission controller 1110 may execute the phantom token-based WFQing functionality, if such feature is activated by the operator and/or allowed under the policy management node 1118, to constrain the bitrates of the ABR clients while maximizing the bandwidth allocated to the non-ABR clients as needed.

Figure 12:
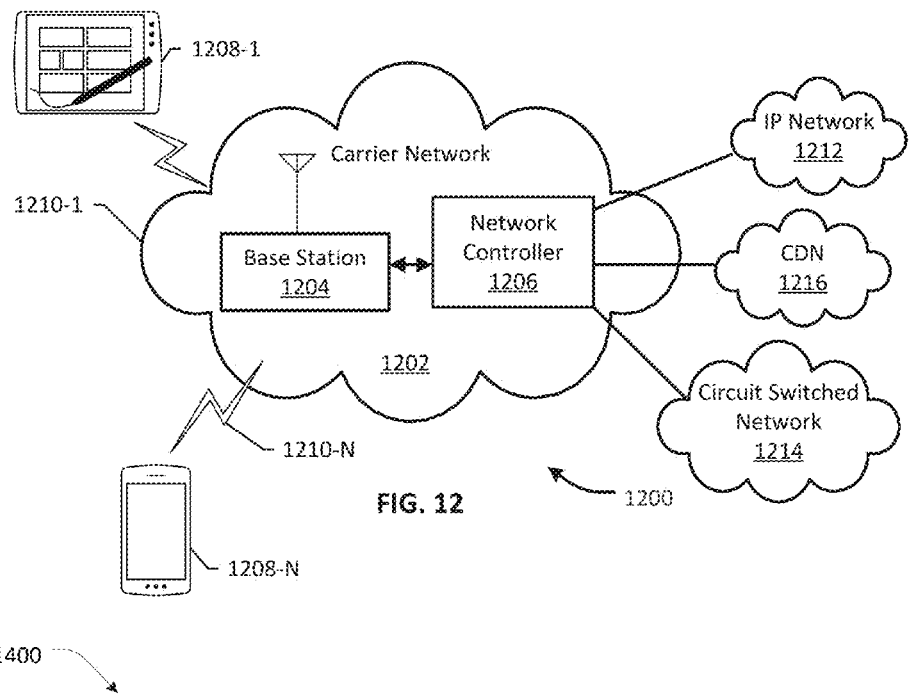
FIG. 12 depicts an example wireless network environment for optimizing bandwidth allocation in a base station link according to an embodiment of the present invention.

FIG. 12 depicts an example wireless network environment 1200 for optimizing bandwidth allocation in a base station link according to another embodiment of the present invention. A plurality of exemplary wireless or mobile devices 1208-1 to 1208-N are shown as being operational in the wireless environment 1200 comprising an exemplary mobile communication network or carrier network 1202. In the discussion herein, the terms "wireless network," "mobile communication network," "carrier network," or terms of similar import may be used interchangeably to refer to a wireless communication network (e.g., a cellular network, a proprietary data communication network, a corporate-wide wireless network, etc.) that facilitates voice and/or data communications with different types of wireless mobile devices (e.g., devices 1208-1 to 1208-N). In one embodiment, some of the devices may be a wireless User Equipment (UE) or a Mobile Station (MS) (also known by various analogous terms such as "mobile handset," "wireless handset," "mobile device," "mobile terminal," etc.) capable of receiving adaptively streamed/delivered audio-visual content from the network 1202 and playing it using a local ABR client player executing thereon. In some other embodiments, wireless mobile devices may comprise portable gaming devices, electronic tablets, laptops equipped with suitable wireless modems, e-readers, and the like, as alluded to previously. Further, optionally, at least some of the devices are operative as non-ABR clients configured to continuously pull data in progressive download sessions.

Wireless UE devices 1208-1 to 1208-N are shown to be in wireless communication (via respective radio communication paths 1210-1 to 1210-N) with the wireless network 1202 through one or more base stations, e.g., base station (BS) 1204 (also interchangeably referred to herein as a "mobile communication network node" or simply a "node") of the network 1202. The example base station 1204 may provide radio interface (in the form of suitable Radio Frequency (RF) links depending on the particular mobile communications technology) to devices 1208-1 to 1208-N via appropriate antenna elements. By way of example, the base station 1204 may comprise a base station in a Third Generation (3G) network, or an evolved Node-B (eNodeB or eNB) when the carrier network is a Third Generation Partnership Project's (3GPP) Long Term Evolution (LTE) network. In some example embodiments, the base station 1204 may also include a site controller, an access point (AP), a radio tower, or any other type of radio interface device capable of operating in a wireless environment. In addition to providing air interface or wireless channel (e.g., as represented by wireless links 1210-1 to 1210-N) to the wireless UE devices, the communication node (or base station) 1204 may also perform radio resource management (as, for example, in case of an eNodeB in an LTE system). In case of a 3G carrier network, example base station 1204 may include functionalities of a 3G base station along with some or all functionalities of a 3G Radio Network Controller (RNC). Additionally, base station 104 may be part of an Access Network (AN) (not shown) portion of the carrier network 1202, wherein the AN may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN), a Worldwide Interoperability for Microwave Access (Wi-MAX) network, and the like.

Example carrier network 1202 may include a radio network controller (RNC) 1206 coupled to the base station 1204 for providing logical and control functions relative to, e.g., roaming support and/or terminal mobility management, subscriber account management, billing, etc., as well as accessing of external networks or communication entities and delivery of streamed A/V content from one or more content sources. Connectivity to other networks or infrastructures such as, for instance, the Internet 1212, CDN 1216 and a circuit-switched landline telephone network (i.e., a Public-Switched Telephone Network or PSTN) 1214, is illustrated. In case of an LTE carrier network, network controller 1206 may include some or all functionalities of an Access Gateway (AGW) or an Evolved Packet Core (EPC) node. In certain embodiments, such functionalities may comprise, for example, an IMT core network functionality or an ETSI TISPAN (European Telecommunications Standards Institute TIPHON (Telecommunications and Internet Protocol Harmonization over Networks) and SPAN (Services and Protocols for Advanced Networks)) core network functionality. Regardless of a particular implementation of the carrier network, base station 1204 and/or network controller functionality 1206 may be configured to facilitate a phantom token-based bandwidth transmission controlling mechanism for managing the bandwidth of the link that supports various ABR and non-ABR sessions effectuated via base station 1204 in its coverage area.

Figure 13:
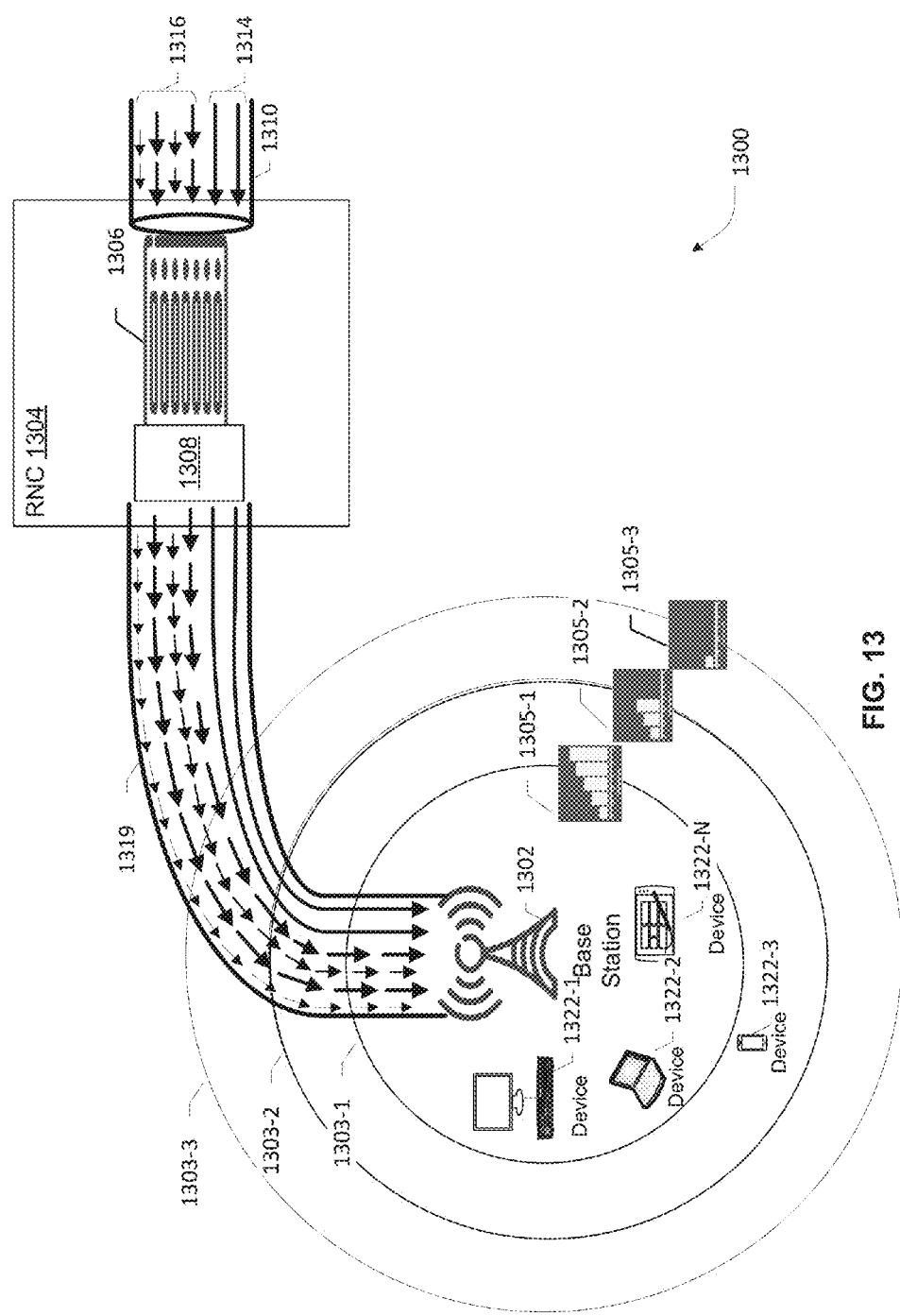
FIG. 13 depicts a portion of the example wireless network environment of FIG. 12 in additional detail.

FIG. 13 depicts a portion 1300 of the example wireless network environment of FIG. 12 in additional detail wherein the interactions between a mobile edge node or network controller 1304 and base station 1302 having a variable coverage area are illustrated. As is known in the art, a radio coverage area by a base station may take any shape and include varying levels of signal quality and strength. Illustratively, the coverage area of base station 1302 is exemplified as circular regions 1303-1 to 1303-3 of varying signal, each depicted with a respective signal level indicator icon, 1305-1 1305-3 respectively. Contour 1303-1 having the highest signal quality is closest to base station 1302, whereas contours 1303-1 and 1303-3 are spaced further away from the base station, with progressively deteriorating signal quality (i.e., strength, level, etc.). A plurality of mobile client devices 1322-1 to 1322-6 having respective priority weights are engaged in ABR or, optionally, non-ABR download sessions facilitated via link 1319 disposed between base station 1302 and RNC node 1304. It should be appreciated that these devices may be associated with different mobile subscribers served within the coverage area of the base station 1302 and may also be disposed in different regions of varying signal quality.

In one embodiment, mobile edge node 1304 may comprise an RNC that includes a mobile network proxy 1306 operatively coupled via a suitable incoming broadband link or backhaul communication path 1310 to an Internet/broadband network for receiving ABR and non-ABR content from various sources. Reference numeral 1316 refers to a plurality of ABR sessions and reference numeral 1314 refers to one or more optional non-ABR sessions delivered or received via communication path 1310. In accordance with the teachings of the present disclosure, an embodiment of a phantom token-based WFQing bandwidth transmission controller 1308 is operative in association with the mobile proxy element 1306 for managing the bandwidth allocation in respect of backhaul link 1319 provided between RNC 1304 and base station 1302, which may be a saturated link. Similar to the embodiments described above, when a mobile ABR client being served by base station 1302 enters inactive phases of its duty cycle, the bandwidth transmission controller 1308 may execute the phantom token-based WFQing functionality, if such feature is activated by the operator, to constrain the bitrates of the mobile ABR clients. Additionally, where non-ABR mobile clients are disposed in the radio coverage area, extra bandwidth may be allocated to a non-ABR client as desired.

Figure 14:
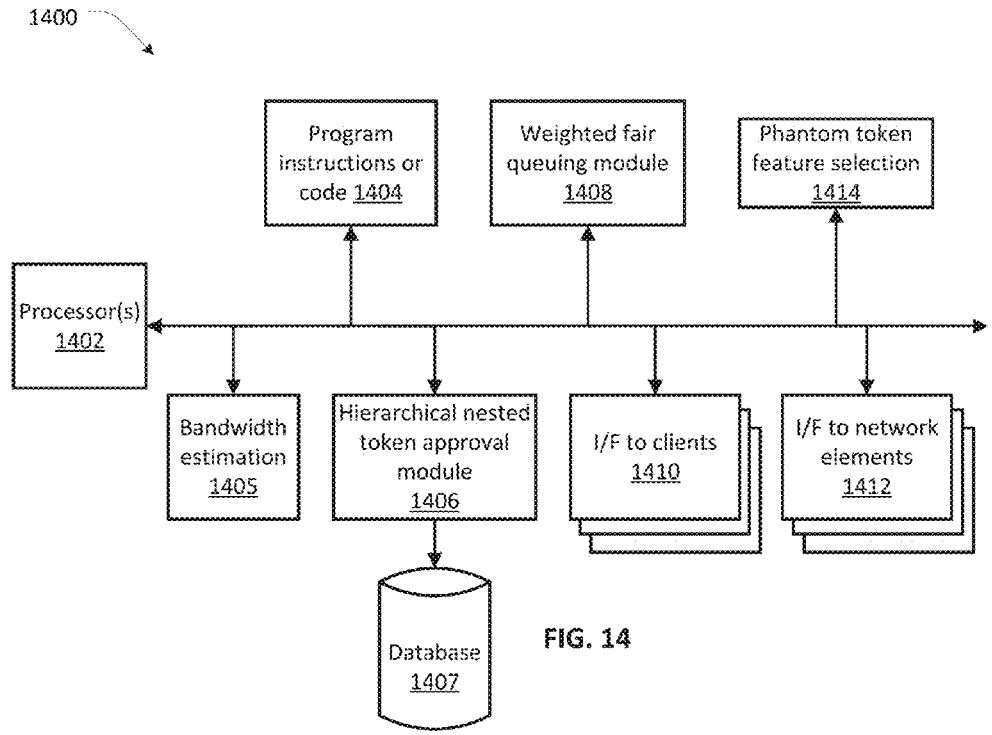
FIG. 14 depicts a block diagram of an example apparatus for implementing at least a portion of an embodiment of the systems of FIGS. 2A/2D in one or more arrangements described in the present patent application.

FIG. 14 depicts a block diagram of an example apparatus for implementing at least a portion of an embodiment of the systems of FIGS. 2A and/or 2D in one or more arrangements described hereinabove. Depending on the implementation, apparatus 1400 may be configured as a bandwidth transmission controller located at a network node or a bandwidth delivery controller located at a premises node. In another variation, apparatus 1400 may also be configured as an integrated entity that combines the network node functionalities as well as bandwidth management functionalities. In a still further variation, apparatus 1400 may comprise an integrated entity that combines the premises node functionalities and bandwidth management functionalities. One or more processors 1402 may be operatively coupled to various modules that may be implemented in persistent memory for executing suitable program instructions or code portions with respect to one or more processes set forth hereinabove for effectuating phantom token-based WFQing. A hierarchical/nested token approval module 1406 having multi-level token approval logic, including a selectively and independently deactivate-able first and second stages is operatively coupled to accounting log database(s) 1407. As previously described, a bandwidth estimation and allocation 1405 operative in conjunction with the multi-level token approval logic is operative to estimate bandwidth allocation by accounting for phantom packets on behalf of an ABR client in its sleep phase of the duty cycle. A weighted fair queuing module 1408 is configured to operate in combination with the hierarchical approval module 1406 to effectuate selection and queuing of NTT payloads in accordance with the processes previously described. Additional information regarding an implementation of weighted fair queuing may be found in the commonly owned U.S. patent application(s) and/or patents: (i) "WEIGHTED INGEST POLICY MANAGEMENT IN A CONTENT DISTRIBUTION NETWORK", application Ser. No. 13/898,125, filed May 20, 2013, in the name(s) of Chris Phillips et al., published as U.S. Patent Application Publication No. 2014/0344879, incorporated by reference herein. Appropriate client interfaces (I/F) 1410 to ABR and non-ABR clients may be provided in an embodiment where the phantom token-based WFQing functionality is implemented at a premises node or gateway. Likewise, appropriate interfaces 1412 to various network elements and/or premises nodes may be provided in a network node implementation. For example, in a CDN implementation, such interfaces may include interfaces to one or more regional distribution nodes, or other peer edge delivery nodes, or policy management nodes, or HTTP content servers, etc., as well as interfaces configured to effectuate a delivery pipe to a subscriber premises node. In a mobile communications network implementation, the interfaces may include interfaces to downstream backhaul network elements, e.g., to base stations, or upstream backhaul network elements, e.g., HTTP content servers, as well as other network elements of a mobile network infrastructure. Accordingly, depending on the implementation, interfaces selected from interfaces 1412 may sometimes be referred to as a first interface, a second interface, and the like. Regardless of the specific implementation, however, apparatus 1400 may be configured to execute a bandwidth transmission control method that involves: estimating bandwidth in a communication link to a node operative to serve a plurality of client devices comprising one or more ABR clients and one or more non-ABR clients by simulating network contention on the communication link using and accounting for phantom packets on behalf of an ABR client that enters a sleep phase of its duty cycle; and, optionally, allocating any excess bandwidth to a non-ABR client. In a further variation of apparatus 1400, a feature selection module 1414 may be provided for selectively activating or deactivating the phantom token functionality, replacement stage functionality, etc., e.g., under control of suitable program instructions 1404 responsive to network operator signals, as discussed above.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for managing bandwidth of a delivery pipe serving a subscriber premises that includes at least one adaptive bitrate (ABR) client engaged in an ABR streaming session, the method comprising:
when the at least one ABR client enters a sleep phase of a duty cycle associated with its ABR streaming session, receiving, at a first stage of a hierarchical token approval logic module (TALM), a phantom token from a leaf sequencer associated with a network transmission thread (NTT) corresponding to the at least one ABR client, the phantom token for providing an amount of phantom payload used in bandwidth estimation;
if the first stage of the hierarchical TALM chooses the phantom token for approval, optionally replacing the phantom token, by a second stage of the hierarchical TALM, with a non-phantom token from a leaf sequencer associated with an NTT corresponding to a non-ABR client; and
processing the non-phantom token pursuant to a weighted fair queuing module for obtaining permission to transmit a payload of the NTT corresponding to the non-ABR client if included in the subscriber premises.

2. The method as recited in claim 1, further comprising:
accounting for the phantom token in an accounting log of the first stage of the hierarchical TALM in an entry corresponding to the leaf sequencer associated with the at least one ABR client, if the phantom token is chosen by the first stage of the hierarchical TALM; and
accounting for the non-phantom token chosen for replacing the phantom token in a replacement accounting log of the second stage of the hierarchical TALM, in an entry corresponding to the leaf sequencer associated with the at least one non-ABR client.

3. The method as recited in claim 1, further comprising:
if the first stage of the hierarchical TALM chooses a non-phantom token from a leaf sequencer associated with an NTT of another client, accounting for that non-phantom token in both the accounting log of the first stage of the hierarchical TALM and an accounting log of the second stage of the hierarchical TALM, in entries corresponding to the leaf sequencer associated with the another client.

4. The method as recited in claim 3, wherein the another client is one of another ABR client and another non-ABR client.

5. The method as recited in claim 1, wherein the first and second stages of the hierarchical TALM are operative at one of: (i) a network node disposed in an edge distribution network associated with a Digital Subscriber Line (DSL) architecture; and (ii) a network node disposed in an edge distribution network associated with a Data Over Cable Service Interface Specification (DOCSIS)-compliant Cable Modem Termination System (CMTS) architecture.

6. The method as recited in claim 1, wherein the first and second stages of the hierarchical TALM are operative at one of: (i) a DSL gateway of the subscriber premises; and (ii) a DOCSIS cable modem of the subscriber premises.

7. An apparatus for managing bandwidth of a delivery pipe serving a subscriber premises that includes at least one adaptive bitrate (ABR) client engaged in an ABR streaming session, the apparatus comprising:
a processor;
a hierarchical token approval logic module (TALM) coupled to the processor; and
a persistent memory module coupled to the processor, wherein the persistent memory module includes program instructions which, when executed by the processor, are configured to perform:
when the at least one ABR client enters a sleep phase of a duty cycle associated with its ABR streaming session, receiving, at a first stage of the hierarchical TALM, a phantom token from a leaf sequencer associated with a network transmission thread (NTT) corresponding to the at least one ABR client, the phantom token for providing an amount of phantom payload used in bandwidth estimation;
if the first stage of the hierarchical TALM chooses the phantom token for approval, optionally replacing the phantom token, by a second stage of the hierarchical TALM, with a non-phantom token from a leaf sequencer associated with an NTT corresponding to a non-ABR client; and
processing the non-phantom token pursuant to a weighted fair queuing module for obtaining permission to transmit a payload of the NTT corresponding to the non-ABR client if included in the subscriber premises.

8. The apparatus as recited in claim 7, wherein the program instructions further comprise:
instructions configured to account for the phantom token in an accounting log of the first stage of the hierarchical TALM in an entry corresponding to the leaf sequencer associated with the at least one ABR client, if the phantom token is chosen by the first stage of the hierarchical TALM; and
instructions configured to account for the non-phantom token chosen to replace the phantom token in a replacement accounting log of the second stage of the hierarchical TALM, in an entry corresponding to the leaf sequencer associated with the non-ABR client.

9. The apparatus as recited in claim 7, wherein the program instructions further comprise:
instructions configured to, based on determining that the first stage of the hierarchical TALM has selected a non-phantom token from a leaf sequencer associated with an NTT of another client, account for that non-phantom token in both the accounting log of the first stage of the hierarchical TALM and an accounting log of the second stage of the hierarchical TALM, in entries corresponding to the leaf sequencer associated with the other client.

10. The apparatus as recited in claim 7, wherein the apparatus is configured to operate at one of: (i) a network node disposed in an edge distribution network associated with a Digital Subscriber Line (DSL) architecture; and (ii) a network node disposed in an edge distribution network associated with a Data Over Cable Service Interface Specification (DOCSIS)-compliant Cable Modem Termination System (CMTS) architecture.

11. The apparatus as recited in claim 7, wherein the apparatus is configured to operate at one of: (i) a DSL gateway of the subscriber premises; and (ii) a DOCSIS cable modem of the subscriber premises.

12. A bandwidth management system, comprising:
a plurality of network transmission threads (NTTs) corresponding to communication sessions of a plurality of client devices disposed in a subscriber premises served by a delivery pipe, the plurality of client devices includes one or more adaptive bitrate (ABR) clients and an optional non-ABR client;

a plurality of leaf sequencers configured to receive transmission request tokens from one or more NTTs, each leaf sequencer operating for a transmission class of communication flows or sessions; and a two-stage token approval logic module (TALM) that is selectively operative as a single stage module or a dual stage module, including:

a first stage component configured to receive (i) phantom tokens from leaf sequencers servicing NTTs that correspond to one or more ABR clients in inactive phases of their respective traffic download duty cycles, (ii) regular tokens from leaf sequencers servicing NTTs that correspond to one or more ABR clients in active phases of their respective traffic download duty cycles, and (iii) regular tokens from leaf sequencers servicing NTTs that correspond to one or more optional non-ABR clients;

a second stage component operating selectively in conjunction with the first stage component and configured to receive only regular tokens from (i) leaf sequencers servicing NTTs that correspond to one or more ABR clients in active phases of their respective traffic download duty cycles, and (ii) if one or more optional non-ABR clients are included, from leaf sequencers servicing NTTs that correspond to the one or more optional non-ABR clients; and each of the first and second stage components including a queuing module, configured for selecting regular tokens from either the first stage component or the second stage component for queuing payload data from the NTTs associated with the selected regular tokens for transmission via the delivery pipe, wherein a token reconciliation logic module coupled to the first and second stage components is configured to perform:

if the first stage component chooses a regular token, updating each accounting log of the first and second stage components in respective entries corresponding to the leaf sequencer from which the regular token is selected; and otherwise, if the first stage component chooses a phantom token, updating the accounting log of the first stage component in an entry corresponding to the leaf sequencer from which the phantom token is selected; choosing a regular token by the second stage component to replace the phantom token with the regular token; and updating the accounting log of the second stage component in an entry corresponding to the leaf sequencer from which the regular token is selected for replacement.

13. The bandwidth management system as recited in claim 12, further comprising a rate limiter coupled to the token reconciliation module and operative to implement a network operator bandwidth policy.

14. The bandwidth management system as recited in claim 12, wherein the transmission class for a leaf sequencer is configured based on an IP address of a client device.

15. The bandwidth management system as recited in claim 12, wherein the transmission class for a leaf sequencer is configured based on a session ID of a communication session.

16. The bandwidth management system as recited in claim 12, wherein the transmission class for a leaf sequencer is configured based on quality of service.

17. The bandwidth management system as recited in claim 12, wherein the second stage component is configured to choose a regular token from a leaf sequencer associated with an NTT corresponding to a non-ABR client.

18. The bandwidth management system as recited in claim 12, wherein the bandwidth management system is configured to operate at one of: (i) a network node disposed in an edge distribution network associated with a Digital Subscriber Line (DSL) architecture; and (ii) a network node disposed in an edge distribution network associated with a Data Over Cable Service Interface Specification (DOCSIS)-compliant Cable Modem Termination System (CMTS) architecture.

19. The bandwidth management system as recited in claim 12, wherein the bandwidth management system is configured to operate at one of: (i) a DSL gateway of the subscriber premises; and (ii) a DOCSIS cable modem of the subscriber premises.

* * * * *